(12) United States Patent
Keeling et al.

(10) Patent No.: US 9,352,661 B2
(45) Date of Patent: May 31, 2016

(54) INDUCTION POWER TRANSFER SYSTEM WITH COUPLING AND REACTANCE SELECTION

(71) Applicant: QUALCOMM Incorporated, San Diego, CA (US)

(72) Inventors: Nicholas Athol Keeling, Auckland (NZ); Chang-Yu Huang, Auckland (NZ); Mickel Budhia, Auckland (NZ); Michael Kissin, Auckland (NZ); Jonathan Beaver, Auckland (NZ)

(73) Assignee: QUALCOMM Incorporated, San Diego, CA (US)

(*) Notice: Subject to any disclaimer, the term of this patent is extended or adjusted under 35 U.S.C. 154(b) by 196 days.

(21) Appl. No.: 14/075,688

(22) Filed: Nov. 8, 2013

(65) Prior Publication Data
US 2014/0320090 A1    Oct. 30, 2014

Related U.S. Application Data

(60) Provisional application No. 61/817,275, filed on Apr. 29, 2013.

(51) Int. Cl.
B60L 11/18 (2006.01)
H01F 38/14 (2006.01)
(Continued)

(52) U.S. Cl.
CPC .............. B60L 11/182 (2013.01); H01F 38/14 (2013.01); H02J 5/005 (2013.01); H02J 7/025 (2013.01); Y02T 10/7005 (2013.01); Y02T 10/7072 (2013.01); Y02T 90/122 (2013.01); Y02T 90/14 (2013.01)

(58) Field of Classification Search
CPC ....................................... H02J 5/005

USPC ........................................................ 320/162
See application file for complete search history.

(56) References Cited

U.S. PATENT DOCUMENTS

2010/0201189 A1* 8/2010 Kirby et al. ............... 307/9.1
2010/0244583 A1   9/2010 Shimokawa
(Continued)

FOREIGN PATENT DOCUMENTS

WO   WO-2009045847 A2   4/2009
WO   WO-2012039635 A1   3/2012

OTHER PUBLICATIONS

Covic G.A., et al., "A bipolar primary pad topology for EV stationary charging and highway power by inductive coupling", Energy Conversion Congress and Exposition (ECCE), 2011 IEEE, IEEE, Sep. 17, 2011, pp. 1832-1838, XP032067402.
(Continued)

Primary Examiner — Thuan Do
(74) Attorney, Agent, or Firm — Knobbe, Martens, Olson & Bear LLP

(57) ABSTRACT

A power receiver is configured to supply current to a load and to be wirelessly operatively coupled to a power transmitter and includes a plurality of inductive elements. The power receiver further includes a circuit operatively coupled to the plurality of inductive elements and configured to be selectively switched among a plurality of coupling states. The circuit is further configured to be selectively switched such that each inductive element has a reactance state of a plurality of reactance states. The power receiver further includes a controller configured to select the coupling state and to select the reactance state of each inductive element based on one or more signals indicative of one or more operating parameters of at least one of the power receiver and the power transmitter.

29 Claims, 26 Drawing Sheets

(51) Int. Cl.
*H02J 7/02* (2016.01)
*H02J 5/00* (2016.01)

(56) References Cited

U.S. PATENT DOCUMENTS

2011/0184842 A1   7/2011  Melen
2012/0026726 A1*  2/2012  Recker et al. ................. 362/157
2012/0049861 A1   3/2012  Kim et al.
2012/0098330 A1   4/2012  Ichikawa et al.
2012/0119699 A1   5/2012  Carbunaru et al.

OTHER PUBLICATIONS

International Search Report and Written Opinion—PCT/US2014/034390—ISA/EPO—Aug. 13, 2014.

* cited by examiner

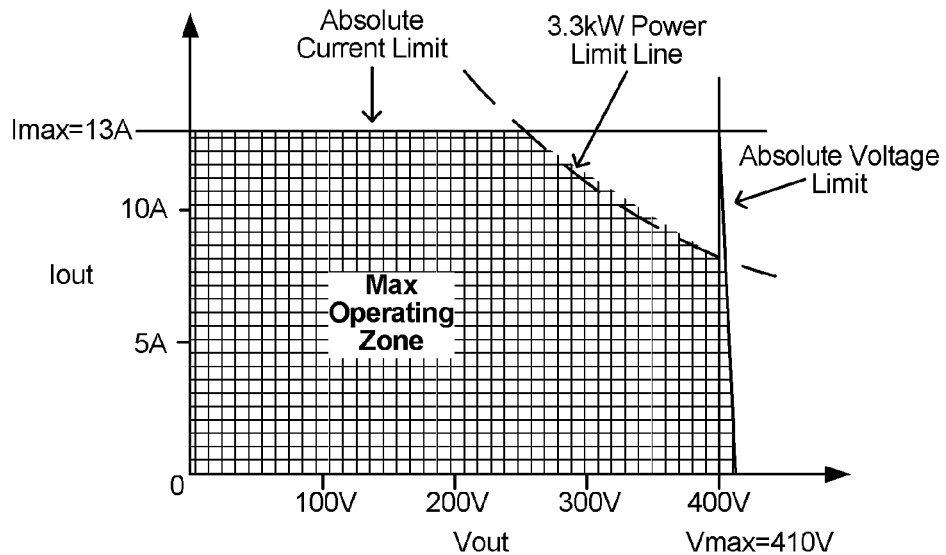
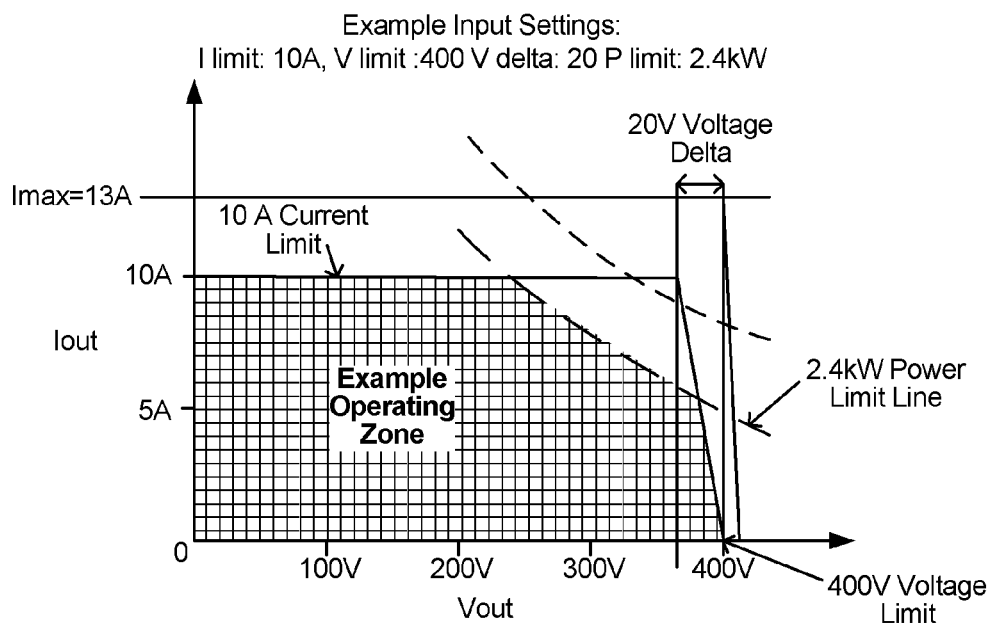
FIG. 8

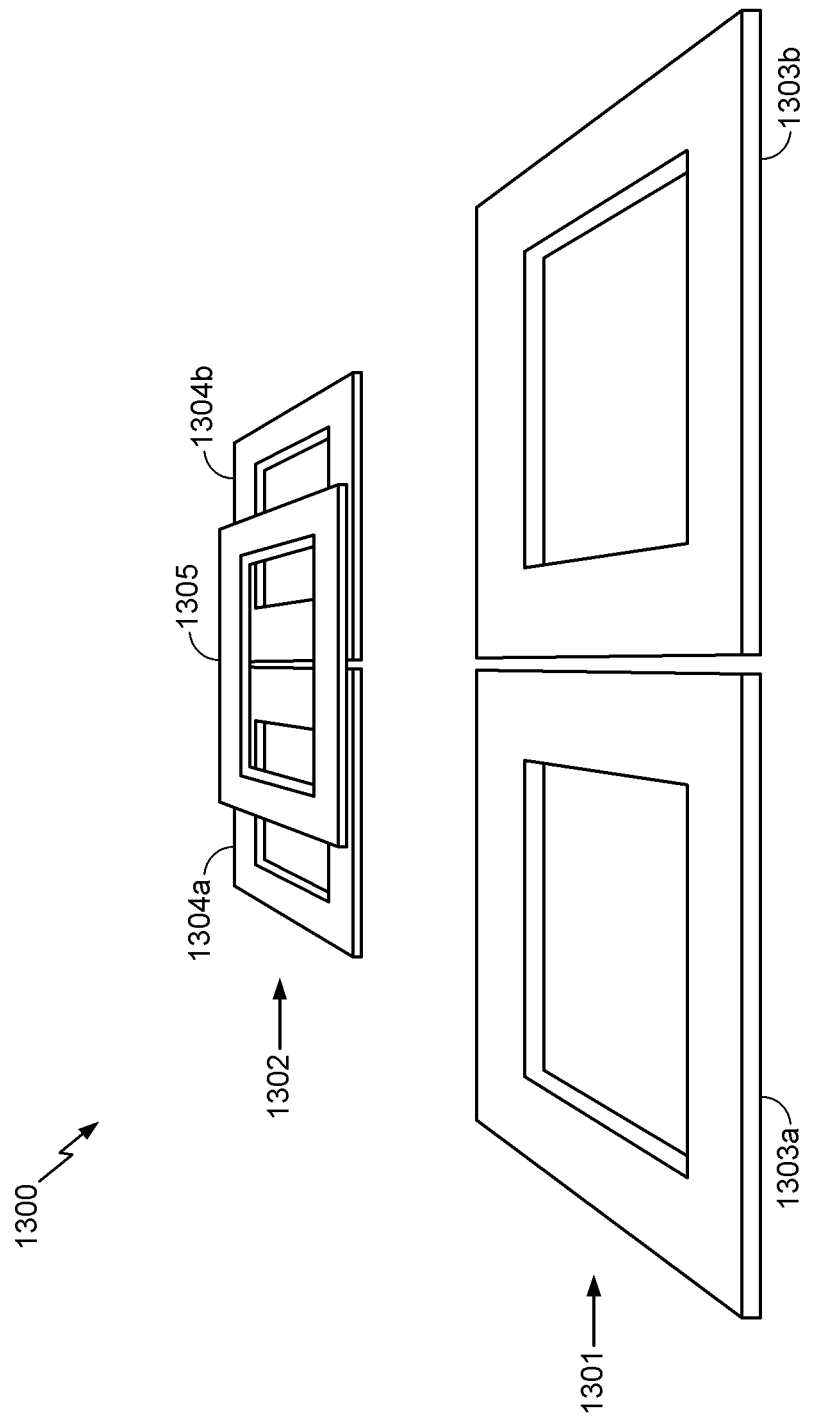

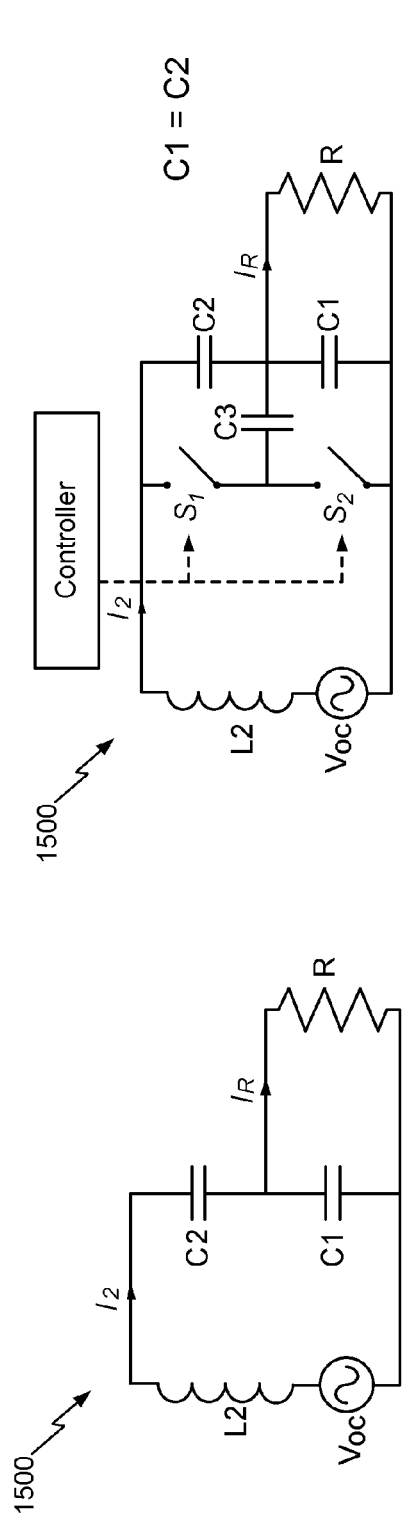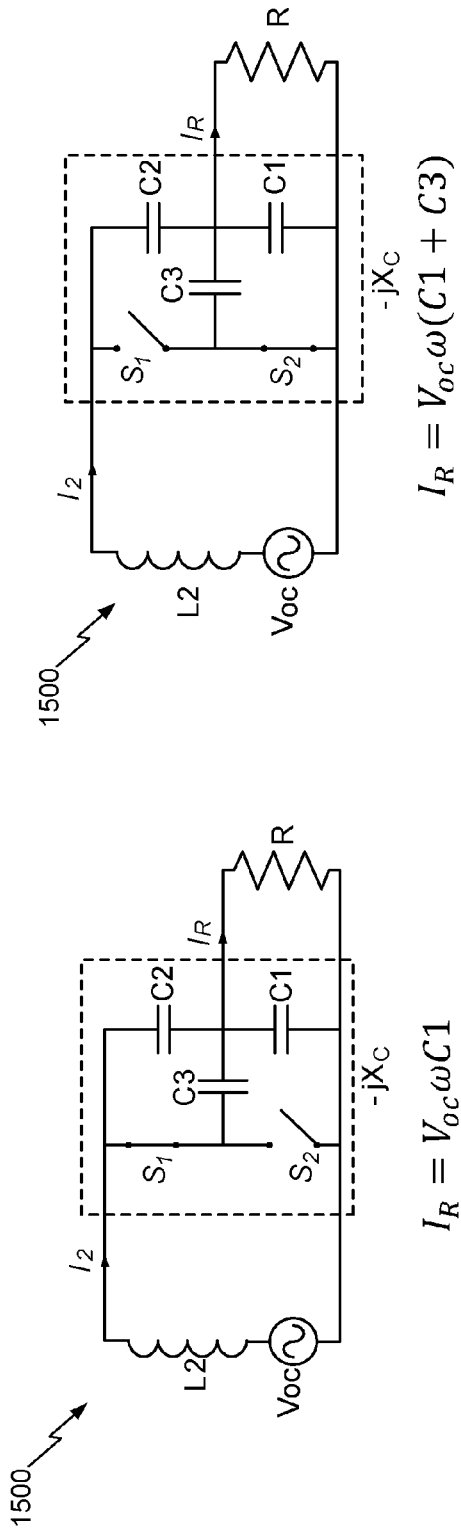

US 9,352,661 B2

INDUCTION POWER TRANSFER SYSTEM WITH COUPLING AND REACTANCE SELECTION

RELATED APPLICATIONS

This application claims the benefit of priority to U.S. Provisional Appl. No. 61/817,275, filed on Apr. 29, 2013 and incorporated in its entirety by reference herein.

FIELD

The present disclosure relates generally to wireless power transfer, and more specifically to devices, systems, and methods related to wireless power transfer to remote systems such as vehicles including batteries by controlling the coupling of a receiver with a transmitter and controlling a reactance of the receiver.

BACKGROUND

Remote systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles (electric vehicles) are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. Wireless charging systems that are capable of transferring power in free space (e.g., via a wireless field) to be used to charge electric vehicles may overcome some of the deficiencies of wired charging solutions. As such, wireless charging systems and methods that efficiently and safely transfer power for charging electric vehicles.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides a power receiver configured to supply current to a load and to be wirelessly operatively coupled to a power transmitter. The power receiver comprises a plurality of inductive elements configured to inductively generate current in response to a magnetic field generated by the power transmitter. The power receiver further comprises a coupling circuit operatively coupled to the plurality of inductive elements. The coupling circuit is configured to be selectively switched among a plurality of coupling states, each coupling state of the plurality of coupling states having a corresponding set of inductive elements of the plurality of inductive elements configured to provide current to the load. The coupling circuit is further configured to be selectively switched such that each inductive element of the set of inductive elements has a reactance state of a plurality of reactance states, each reactance state of the plurality of reactance states having a corresponding reactance. The power receiver further comprises a controller coupled to the coupling circuit and configured to select the coupling state from the plurality of coupling states and to select the reactance state of each inductive element of the set of inductive elements from the plurality of reactance states based on one or more signals indicative of one or more operating parameters of at least one of the power receiver or the power transmitter.

Another aspect of the disclosure provides a method for controlling a current supplied to a load by a power receiver wirelessly operatively coupled to a power transmitter. The power receiver comprises a plurality of inductive elements configured to inductively generate current in response to a magnetic field generated by the power transmitter. The method comprises adjusting a coupling state of the power receiver based on one or more operating parameters of at least one of the power receiver or the power transmitter. The coupling state is selected from a plurality of coupling states, each coupling state of the plurality of coupling states having a corresponding set of inductive elements of the plurality of inductive elements configured to provide current to the load. The method further comprises adjusting a reactance state for each inductive element of the set of inductive elements based on the one or more operating parameters of at least one of the power receiver or the power transmitter, the reactance state selected from a plurality of reactance states.

Another aspect of the disclosure provides a power receiver configured to supply current to a load and to be wirelessly operatively coupled to a power transmitter. The power receiver comprises means for inductively generating current in response to a magnetic field generated by the power transmitter. The power receiver further comprises first means for selectively switching among a plurality of coupling states. Each coupling state of the plurality of coupling states has a corresponding portion of the means for inductively generating current configured to provide current to the load. The power receiver further comprises second means for selectively switching the means for inductively generating current among a plurality of reactance states. The power receiver further comprises means for controlling the first means for selectively switching and for controlling the second means for selectively switching based on one or more signals indicative of one or more operating parameters of at least one of the power receiver or the power transmitter.

BRIEF DESCRIPTION OF THE DRAWINGS

FIG. 8 shows two example plots of ranges of operating parameters for battery charging by the output of a power receiver compatible with certain embodiments described herein.

FIG. 13 is a perspective view illustration of induction coils used in an IPT system in accordance with certain embodiments described herein.

FIGS. 15A-15E schematically illustrate an example coupling circuit of the power receiver in which a reactance of the power receiver can be varied in accordance with certain embodiments described herein.

Figure 1:
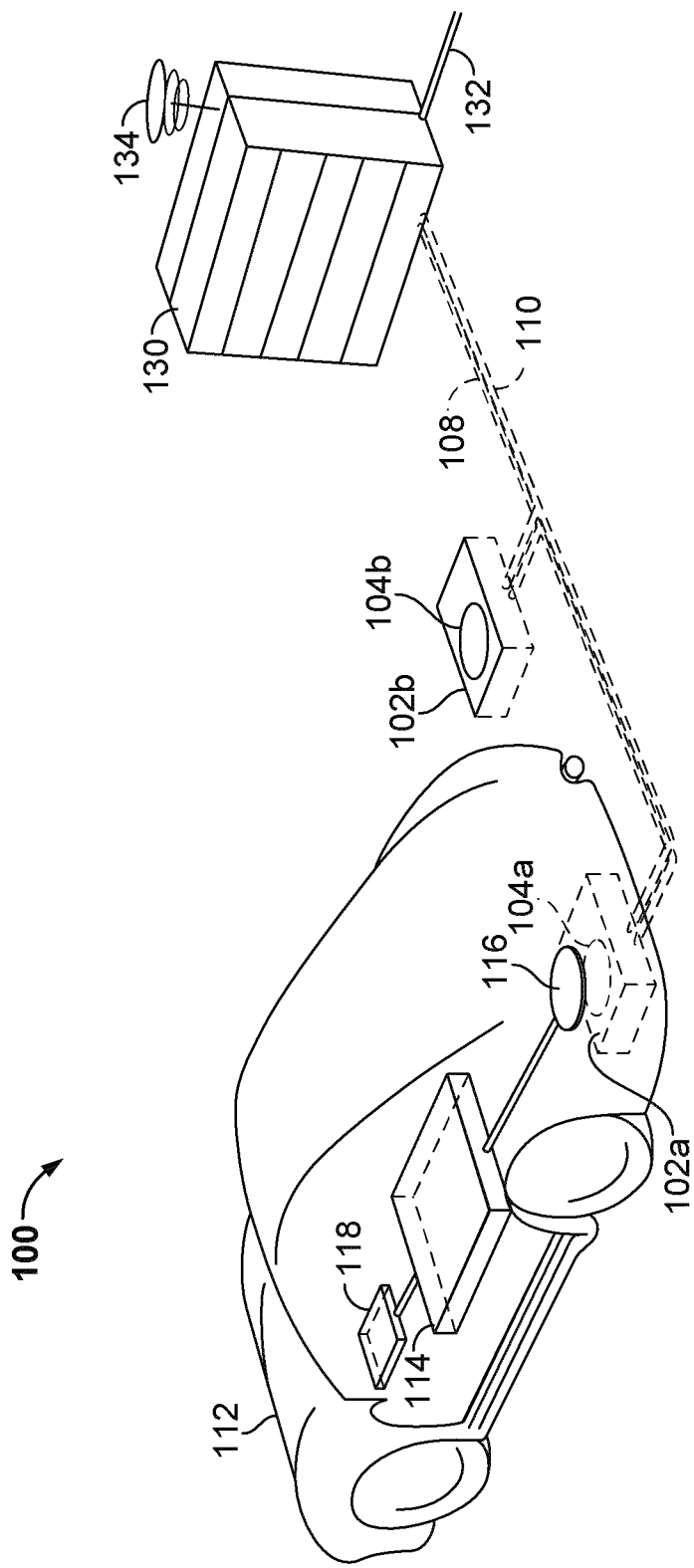
FIG. 1 is a diagram of an exemplary wireless power transfer system for charging an electric vehicle, in accordance with an exemplary embodiment of the invention.

The various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The detailed description set forth below in connection with the appended drawings is intended as a description of exemplary embodiments of the invention and is not intended to represent the only embodiments in which the invention may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the invention. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field) may be received, captured by, or coupled by a "receiving coil" to achieve power transfer.

An electric vehicle is used herein to describe a remote system, an example of which is a vehicle that includes, as part of its locomotion capabilities, electrical power derived from a chargeable energy storage device (e.g., one or more rechargeable electrochemical cells or other type of battery). As non-limiting examples, some electric vehicles may be hybrid electric vehicles that include besides electric motors, a traditional combustion engine for direct locomotion or to charge the vehicle's battery. Other electric vehicles may draw all locomotion ability from electrical power. An electric vehicle is not limited to an automobile and may include motorcycles, carts, scooters, and the like. By way of example and not limitation, a remote system is described herein in the form of an electric vehicle (EV). Furthermore, other remote systems that may be at least partially powered using a chargeable energy storage device are also contemplated (e.g., electronic devices such as personal computing devices and the like).

FIG. 1 is a diagram of an exemplary wireless power transfer system 100 for charging an electric vehicle 112, in accordance with an exemplary embodiment of the invention. The wireless power transfer system 100 enables charging of an electric vehicle 112 while the electric vehicle 112 is parked near a base wireless charging system 102a. Spaces for two electric vehicles are illustrated in a parking area to be parked over corresponding base wireless charging system 102a and 102b. In some embodiments, a local distribution center 130 may be connected to a power backbone 132 and configured to provide an alternating current (AC) or a direct current (DC) supply through a power link 110 to the base wireless charging system 102a. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the electromagnetic field generated by the base system induction coil 104a.

In some exemplary embodiments, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about $\frac{1}{2}\pi$ of wavelength of the base system induction coil 104a (and vice versa for the electric vehicle induction coil 116) as will be further described below.

Local distribution 1130 may be configured to communicate with external sources (e.g., a power grid) via a communication backhaul 134, and with the base wireless charging system 102a via a communication link 108.

In some embodiments the electric vehicle induction coil 116 may be aligned with the base system induction coil 104a and, therefore, disposed within a near-field region simply by the driver positioning the electric vehicle 112 correctly relative to the base system induction coil 104a. In other embodiments, the driver may be given visual feedback, auditory feedback, or combinations thereof to determine when the electric vehicle 112 is properly placed for wireless power transfer. In yet other embodiments, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other embodiments, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
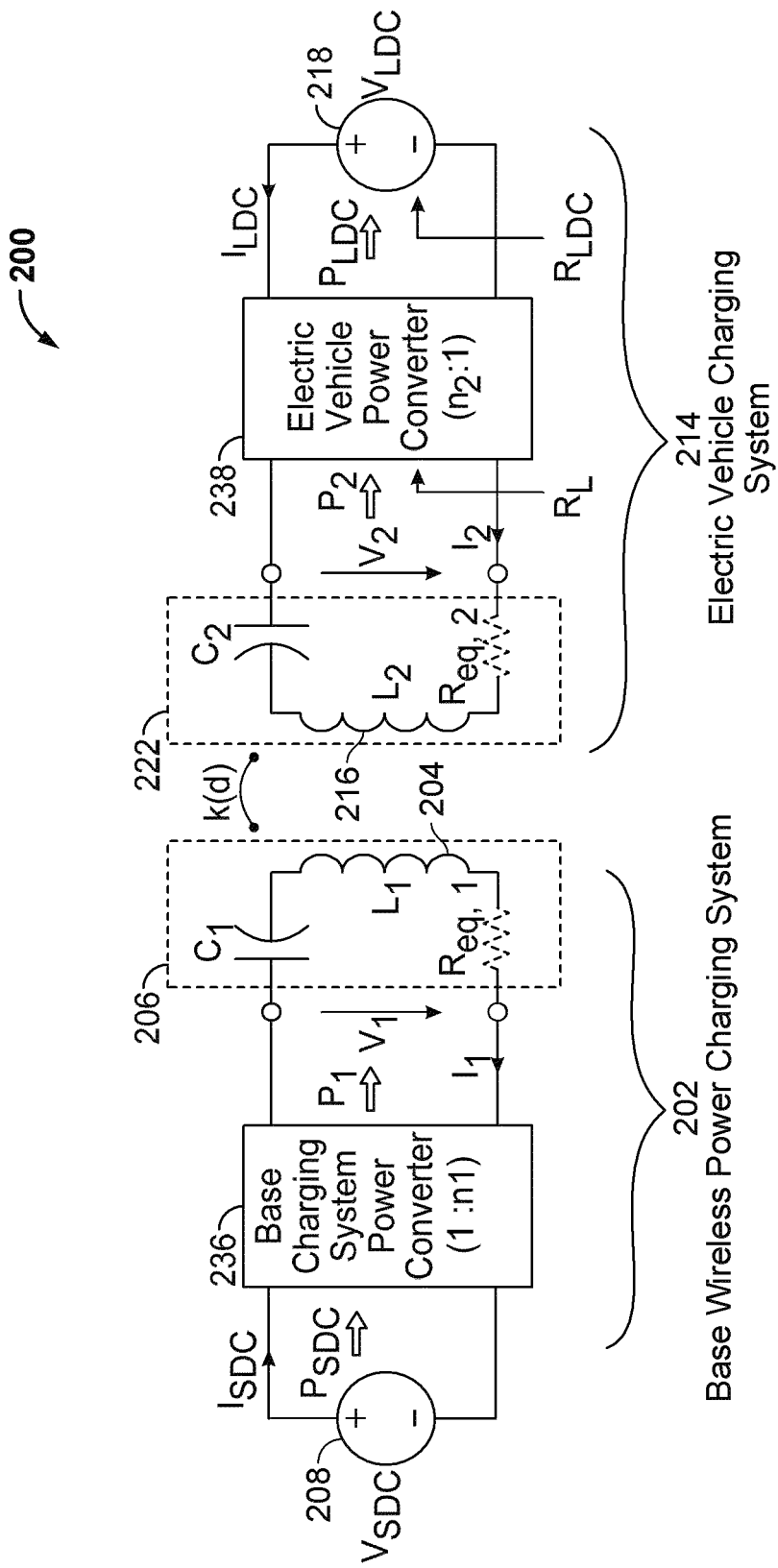
FIG. 2 is a schematic diagram of exemplary core components of the wireless power transfer system of FIG. 1.

FIG. 2 is a schematic diagram of exemplary core components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Embodiments described herein may use capacitively loaded wire loops (i.e., multi-turn coils) forming a resonant structure that is capable of efficiently coupling energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 236. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit an electromagnetic field at a desired frequency. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower).

The base system transmit circuit 206 including the base system induction coil 204 and electric vehicle receive circuit 222 including the electric vehicle induction coil 216 may be tuned to substantially the same frequencies and may be positioned within the near-field of an electromagnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 316 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some embodiments, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in an electromagnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed embodiments may be referred to or configured as "loop" antennas, and more specifically, multi-turn loop antennas. The induction coils 204 and 216 may also be referred to herein or be configured as "magnetic" antennas. The term "coil" generally refers to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger electromagnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region)

where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates an electromagnetic field. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some embodiments, coupling power between two induction coils that are in the near field of one another is disclosed. As described above, the near field may correspond to a region around the induction coil in which electromagnetic fields exist but may not propagate or radiate away from the induction coil. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
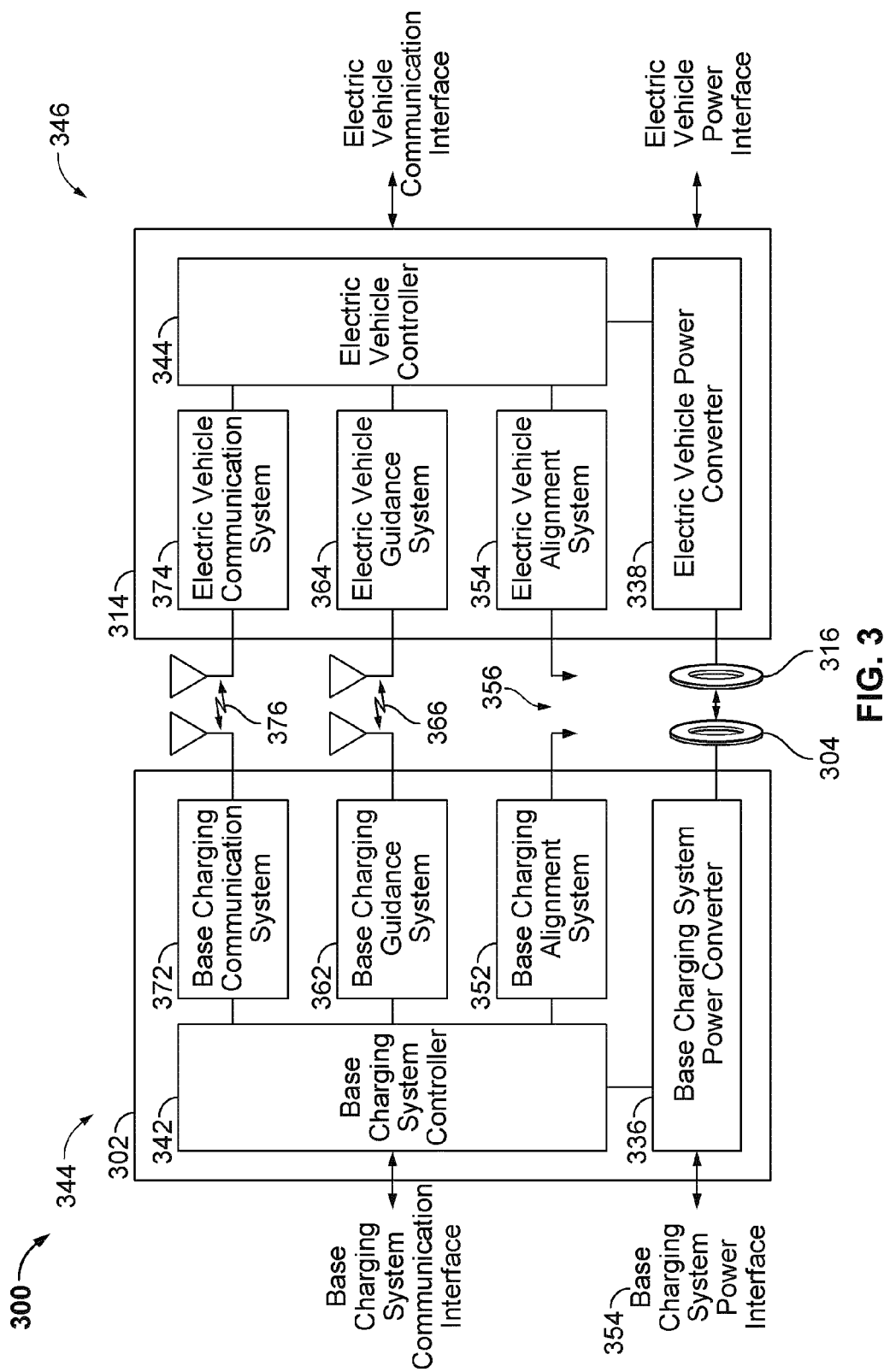
FIG. 3 is another functional block diagram showing exemplary core and ancillary components of the wireless power transfer system of FIG. 1.

FIG. 3 is another functional block diagram showing exemplary core and ancillary components of the wireless power transfer system 300 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 354 may be configured to provide power to a charging system power converter 336 from a power source, such as an AC or DC power supply 126. The base charging system power converter 336 may receive AC or DC power from the base charging system power interface 354 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 (which can be referred to as a base controller unit or BCU) and the electric vehicle charging system 314 includes an electric vehicle controller 344 (which can be referred to as a vehicle controller unit or VCU). The base charging system controller 342 may include a base charging system communication interface 162 to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. These communications channels may be separate physical channels or separate logical channels. As non-limiting examples, a base charging alignment system 352 may communicate with an electric vehicle alignment system 354 through a communication link 376 to provide a feedback mechanism for more closely aligning the base system induction coil 304 and electric vehicle induction coil 316, either autonomously or with operator assistance. Similarly, a base charging guidance system 362 may communicate with an electric vehicle guidance system 364 through a guidance link to provide a feedback mechanism to guide an operator in aligning the base system induction coil 304 and electric vehicle induction coil 316. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensors for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 314 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some embodiments of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some embodiments may be configured to transfer power at a frequency in the range from 10-60 kHz. This low frequency coupling may allow highly efficient power conversion that may be achieved using solid state devices. In addition, there may be less coexistence issues with radio systems compared to other bands.

Figure 4:
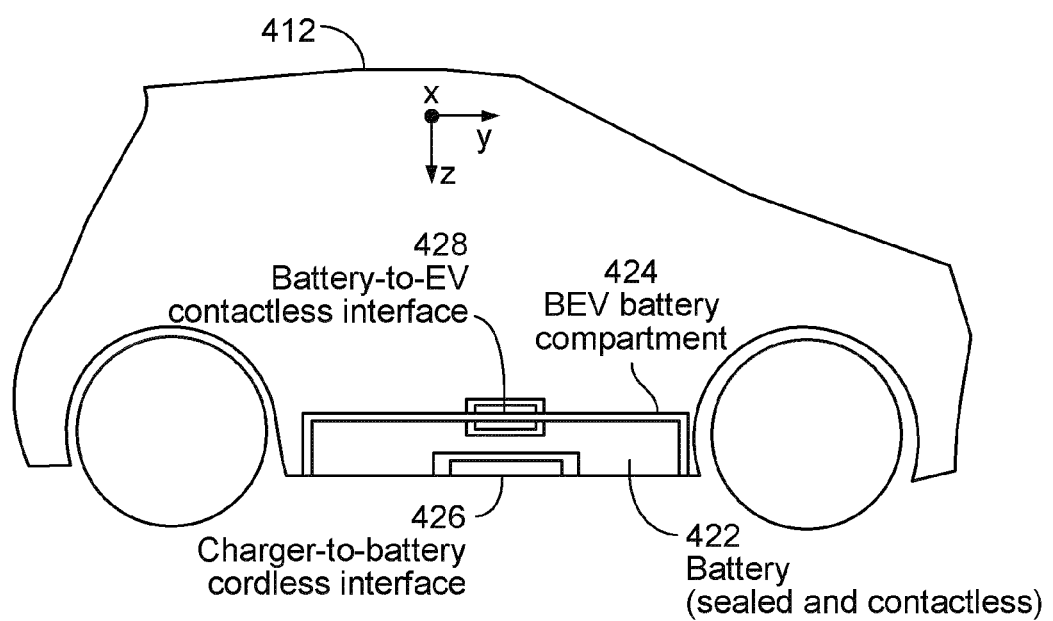
FIG. 4 is a functional block diagram showing a replaceable contactless battery disposed in an electric vehicle, in accordance with an exemplary embodiment of the invention.

The wireless power transfer system 100 described may be used with a variety of electric vehicles 102 including rechargeable or replaceable batteries. FIG. 4 is a functional block diagram showing a replaceable contactless battery disposed in an electric vehicle 412, in accordance with an exemplary embodiment of the invention. In this embodiment, the low battery position may be useful for an electric vehicle battery unit that integrates a wireless power interface (e.g., a charger-to-battery cordless interface 426) and that may receive power from a charger (not shown) embedded in the ground. In FIG. 4, the electric vehicle battery unit may be a rechargeable battery unit, and may be accommodated in a battery compartment 424. The electric vehicle battery unit also provides a wireless power interface 426, which may integrate the entire electric vehicle wireless power subsystem including a resonant induction coil, power conversion circuitry, and other control and communications functions as needed for efficient and safe wireless energy transfer between a ground-based wireless charging unit and the electric vehicle battery unit.

It may be useful for the electric vehicle induction coil to be integrated flush with a bottom side of electric vehicle battery unit or the vehicle body so that there are no protrusive parts and so that the specified ground-to-vehicle body clearance may be maintained. This configuration may require some room in the electric vehicle battery unit dedicated to the electric vehicle wireless power subsystem. The electric vehicle battery unit 422 may also include a battery-to-EV cordless interface 422, and a charger-to-battery cordless interface 426 that provides contactless power and communication between the electric vehicle 412 and a base wireless charging system 102a as shown in FIG. 1.

In some embodiments, and with reference to FIG. 1, the base system induction coil 104a and the electric vehicle induction coil 116 may be in a fixed position and the induction coils are brought within a near-field coupling region by overall placement of the electric vehicle induction coil 116 relative to the base wireless charging system 102a. However, in order to perform energy transfer rapidly, efficiently, and safely, the distance between the base system induction coil 104a and the electric vehicle induction coil 116 may need to be reduced to improve coupling. Thus, in some embodiments, the base system induction coil 104a and/or the electric vehicle induction coil 116 may be deployable and/or moveable to bring them into better alignment.

Figure 5A:
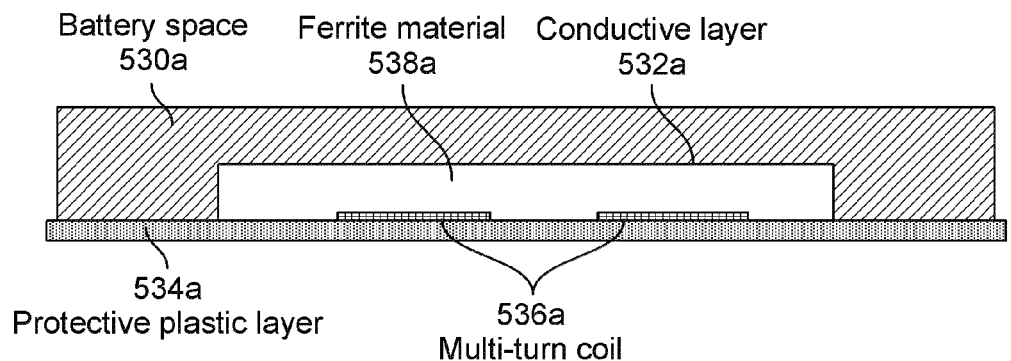
FIGS. 5A, 5B, 5C, and 5D are diagrams of exemplary configurations for the placement of an induction coil and ferrite material relative to a battery, in accordance with exemplary embodiments of the invention.

FIGS. 5A, 5B, 5C, and 5D are diagrams of exemplary configurations for the placement of an induction coil and ferrite material relative to a battery, in accordance with exemplary embodiments of the invention. FIG. 5A shows a fully ferrite embedded induction coil 536a. The wireless power induction coil may include a ferrite material 538a and a coil 536a wound about the ferrite material 538a. The coil 536a itself may be made of stranded Litz wire. A conductive shield 532a may be provided to protect passengers of the vehicle from excessive EMF transmission. Conductive shielding may be particularly useful in vehicles made of plastic or composites.

Figure 5B:
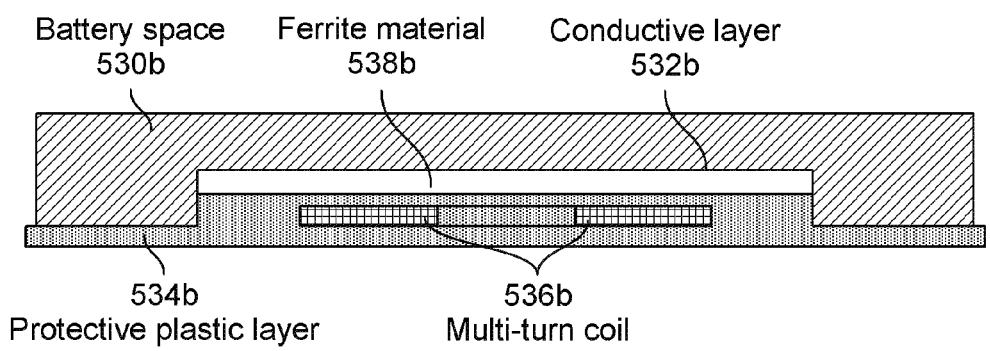

FIG. 5B shows an optimally dimensioned ferrite plate (i.e., ferrite backing) to enhance coupling and to reduce eddy currents (heat dissipation) in the conductive shield 532b. The coil 536b may be fully embedded in a non-conducting non-magnetic (e.g., plastic) material. For example, as illustrated in FIG. 5A-5D, the coil 536b may be embedded in a protective housing 534b. There may be a separation between the coil 536b and the ferrite material 538b as the result of a trade-off between magnetic coupling and ferrite hysteresis losses.

Figure 5C:
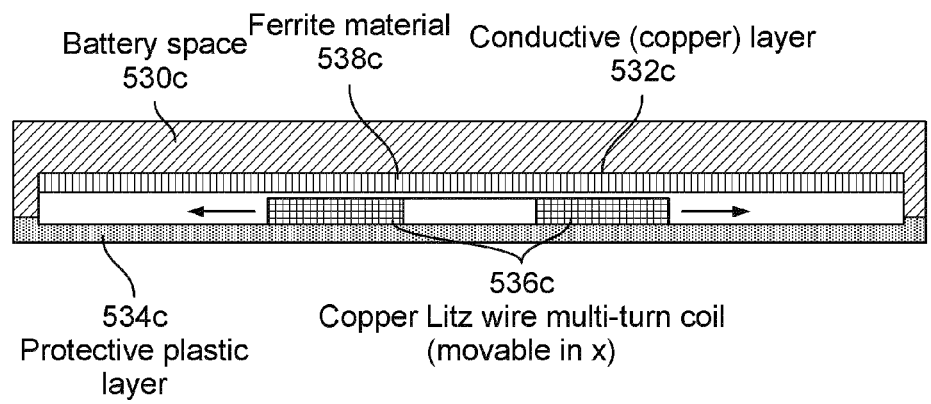
Figure 5D:
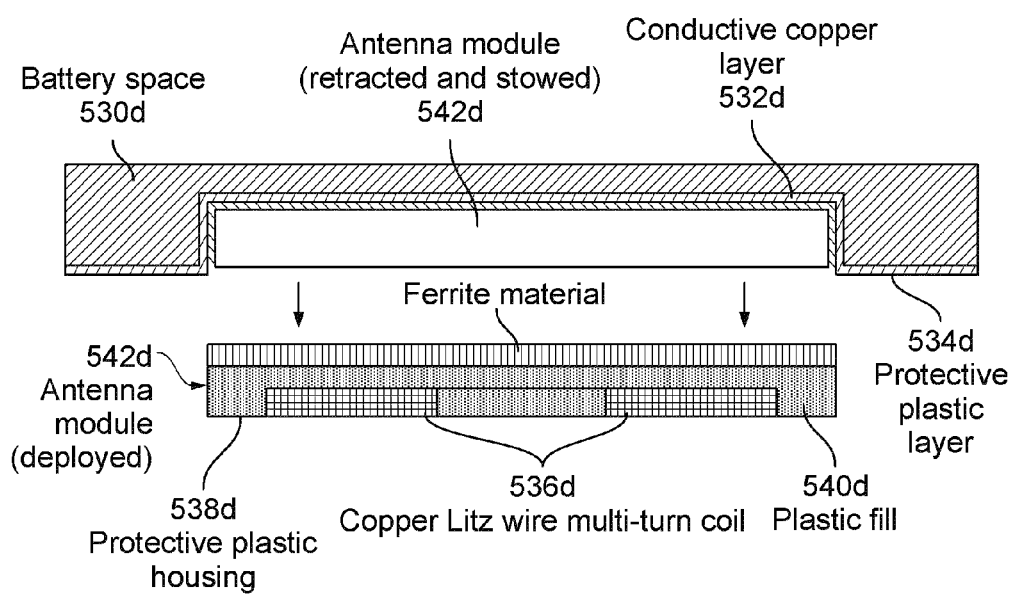

FIG. 5C illustrates another embodiment where the coil 536c (e.g., a copper Litz wire multi-turn coil) may be movable in a lateral ("X") direction. FIG. 5D illustrates another embodiment where the induction coil module is deployed in a downward direction. In some embodiments, the battery unit includes one of a deployable and non-deployable electric vehicle induction coil module 540d as part of the wireless power interface. To prevent magnetic fields from penetrating into the battery space 530d and into the interior of the vehicle, there may be a conductive shield 532d (e.g., a copper sheet) between the battery space 530d and the vehicle. Furthermore, a non-conductive (e.g., plastic) protective layer 533d may be used to protect the conductive shield 532d, the coil 536d, and the ferrite material 538d from environmental impacts (e.g., mechanical damage, oxidization, etc.). Furthermore, the coil 536d may be movable in lateral X and/or Y directions. FIG. 5D illustrates an embodiment wherein the electric vehicle induction coil module 540d is deployed in a downward Z direction relative to a battery unit body.

The design of this deployable electric vehicle induction coil module 542b is similar to that of FIG. 5B except there is no conductive shielding at the electric vehicle induction coil module 542d. The conductive shield 532d stays with the battery unit body. The protective layer 533d (e.g., plastic layer) is provided between the conductive shield 432d and the electric vehicle induction coil module 542d when the electric vehicle induction coil module 542d is not in a deployed state. The physical separation of the electric vehicle induction coil module 542 from the battery unit body may have a positive effect on the induction coil's performance.

As discussed above, the electric vehicle induction coil module 542d that is deployed may contain only the coil 536d (e.g., Litz wire) and ferrite material 538d. Ferrite backing may be provided to enhance coupling and to prevent from excessive eddy current losses in a vehicle's underbody or in the conductive shield 532d. Moreover, the electric vehicle induction coil module 542d may include a flexible wire connection to power conversion electronics and sensor electronics. This wire bundle may be integrated into the mechanical gear for deploying the electric vehicle induction coil module 542d.

With reference to FIG. 1, the charging systems described above may be used in a variety of locations for charging an electric vehicle 112, or transferring power back to a power grid. For example, the transfer of power may occur in a parking lot environment. It is noted that a "parking area" may also be referred to herein as a "parking space." To enhance the efficiency of a vehicle wireless power transfer system 100, an electric vehicle 112 may be aligned along an X direction and a Y direction to enable an electric vehicle induction coil 116 within the electric vehicle 112 to be adequately aligned with a base wireless charging system 102a within an associated parking area.

Furthermore, the disclosed embodiments are applicable to parking lots having one or more parking spaces or parking areas, wherein at least one parking space within a parking lot may comprise a base wireless charging system 102a. Guidance systems (not shown) may be used to assist a vehicle operator in positioning an electric vehicle 112 in a parking area to align an electric vehicle induction coil 116 within the electric vehicle 112 with a base wireless charging system 102a. Guidance systems may include electronic based approaches (e.g., radio positioning, direction finding principles, and/or optical, quasi-optical and/or ultrasonic sensing methods) or mechanical-based approaches (e.g., vehicle wheel guides, tracks or stops), or any combination thereof, for assisting an electric vehicle operator in positioning an electric vehicle 112 to enable an induction coil 116 within the electric vehicle 112 to be adequately aligned with a charging induction coil within a charging base (e.g., base wireless charging system 102a).

As discussed above, the electric vehicle charging system 114 may be placed on the underside of the electric vehicle 112 for transmitting and receiving power from a base wireless charging system 102a. For example, an electric vehicle induction coil 116 may be integrated into the vehicles underbody preferably near a center position providing maximum safety distance in regards to EM exposure and permitting forward and reverse parking of the electric vehicle.

Figure 6:
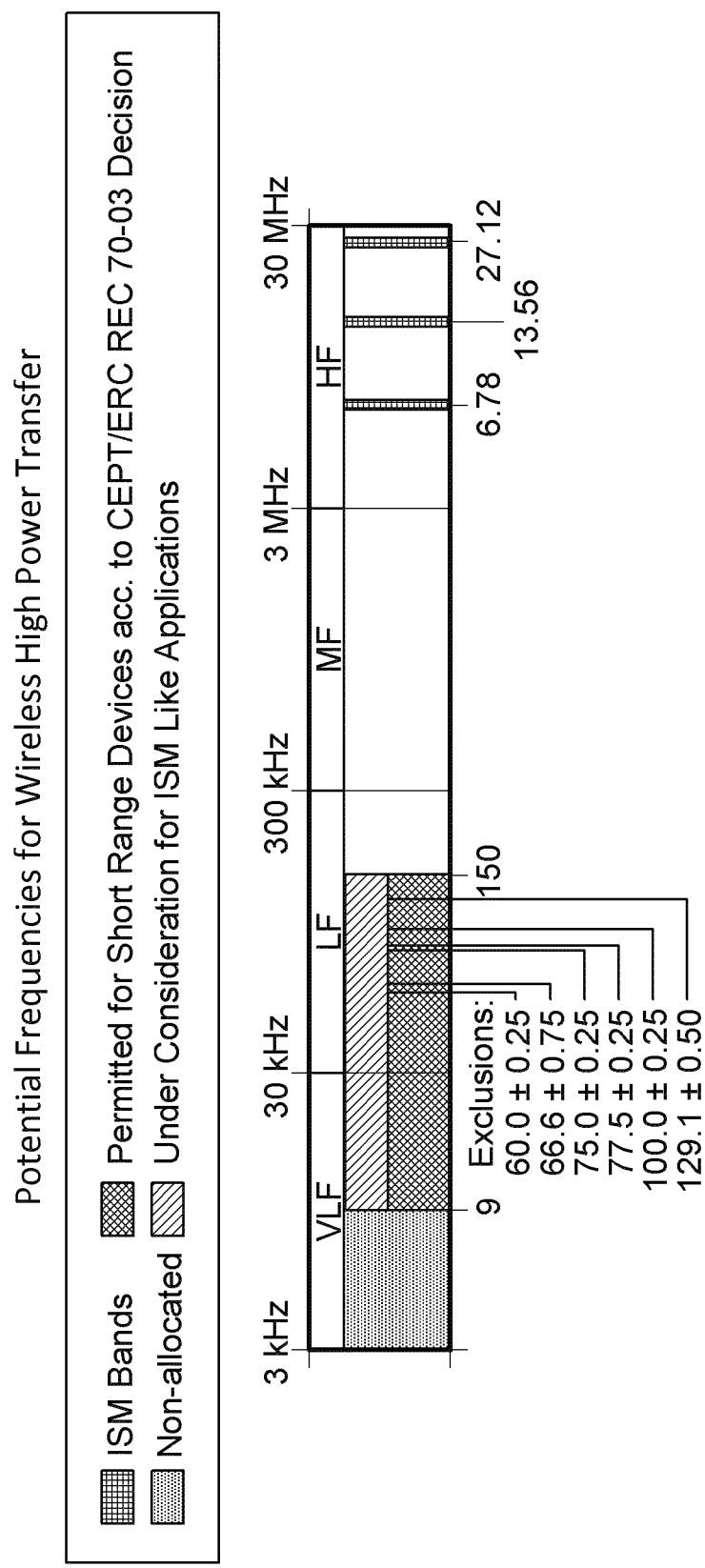
FIG. 6 is a chart of a frequency spectrum showing exemplary frequencies that may be available for wireless charging an electric vehicle, in accordance with an exemplary embodiment of the invention.

FIG. 6 is a chart of a frequency spectrum showing exemplary frequencies that may be used for wireless charging an electric vehicle, in accordance with an exemplary embodiment of the invention. As shown in FIG. 6, potential frequency ranges for wireless high power transfer to electric vehicles may include: VLF in a 3 kHz to 30 kHz band, lower LF in a 30 kHz to 150 kHz band (for ISM-like applications) with some exclusions, HF 6.78 MHz (ITU-R ISM-Band 6.765-6.795 MHz), HF 13.56 MHz (ITU-R ISM-Band 13.553-13.567), and HF 27.12 MHz (ITU-R ISM-Band 26.957-27.283).

Figure 7:
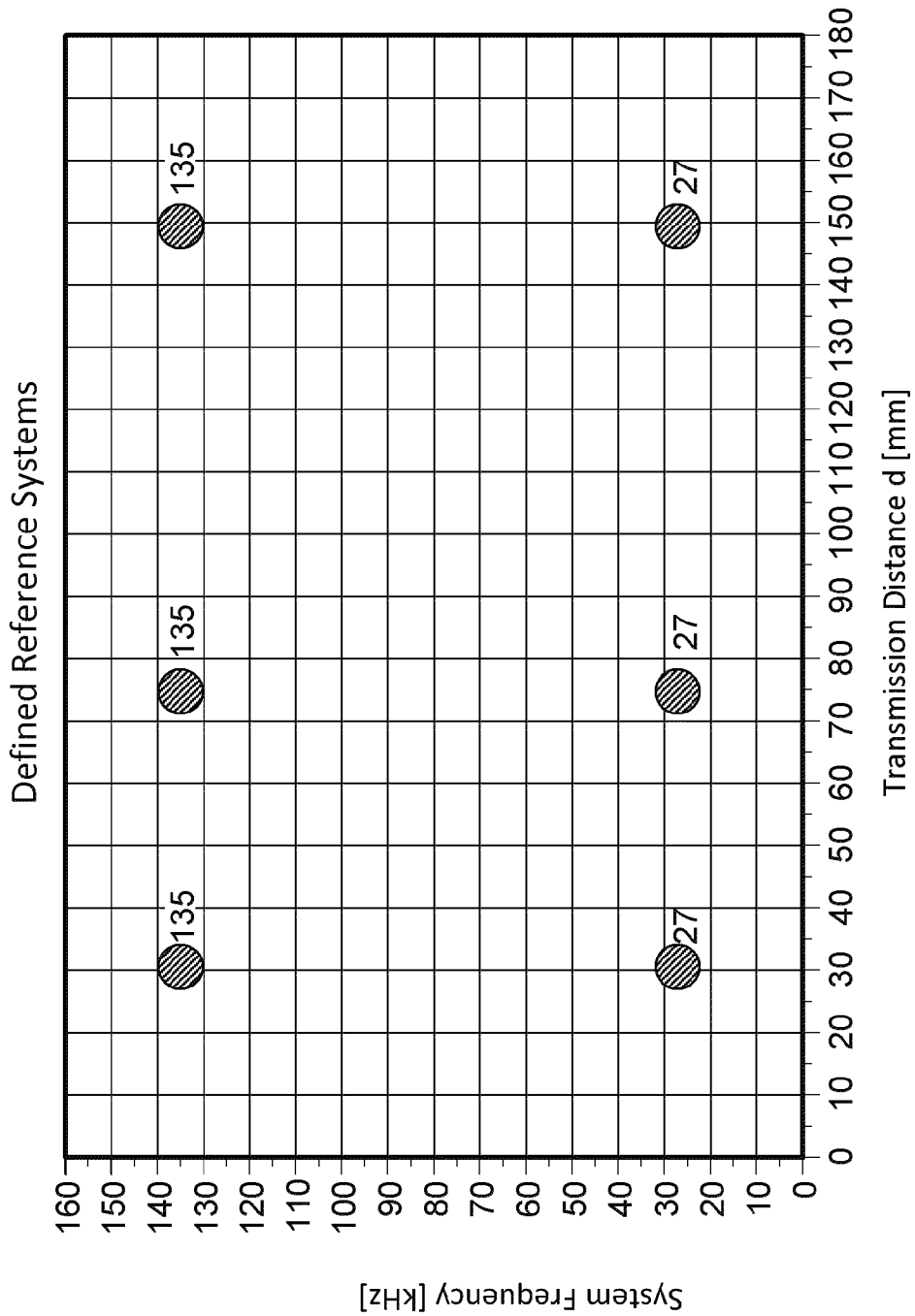
FIG. 7 is a chart showing exemplary frequencies and transmission distances that may be useful in wireless charging electric vehicles, in accordance with an exemplary embodiment of the invention.

FIG. 7 is a chart showing exemplary frequencies and transmission distances that may be useful in wireless charging electric vehicles, in accordance with an exemplary embodiment of the invention. Some example transmission distances that may be useful for electric vehicle wireless charging are about 30 mm, about 75 mm, and about 150 mm. Some exemplary frequencies may be about 27 kHz in the VLF band and about 135 kHz in the LF band.

As described above, the wireless power transfer system 100 (e.g., an inductive power transfer system) in certain embodiments comprises a power transmitter (e.g., base wireless power charging system 202) configured to be wirelessly operatively coupled to a power receiver (e.g., electric vehicle charging system 214). In a typical inductive power transfer system, the base current (e.g., the current supplied to the power transmitter) is adjusted to provide a corresponding change in the output current provided by the power receiver to the load.

However, to effectively provide current to a load (e.g., to effectively charge a battery, such as the battery unit 118 of an electric vehicle 112), the output generated by the power receiver can be advantageously controlled such that more than merely the output current is within a predetermined range of values. More effective use of the output from the power receiver can be achieved by maintaining other operating parameters of the output (e.g., output voltage, output power) to be within predetermined ranges compatible with effective use of the current. For example, when charging a battery using the output of the power receiver, the operating parameters can be selected to match a "battery charge curve" corresponding to effective charging of the battery.

Additional control of one or both of the output voltage and the output power is provided to by regulating the base current in response to measurements of the output voltage and the output current. In certain such embodiments, a state machine can prioritize the operating parameters and regulate the base current to a setpoint that achieves the desired performance.

FIG. 8 shows two example plots of ranges of operating parameters (e.g., "operating zones") for battery charging by the output of a power receiver compatible with certain embodiments described herein. In the top plot of FIG. 8, a maximum operating zone is shown which is defined at least in part by a maximum output current (e.g., "absolute current limit"), a maximum output voltage (e.g., "absolute voltage limit"), and a maximum output power (e.g., "power limit line"). The maximum operating zone shown in the top plot of FIG. 8 is defined by a maximum output current of 13 amps, a maximum output voltage of 410 volts, and a maximum power of 3.3 kilowatts.

In the bottom plot of FIG. 8, an example operating zone (e.g., a specific charge curve for a specific battery to be charged) is shown in which the maximum values of the output current, voltage, and power are further limited from their maximum values (shown in the top plot of FIG. 8). For example, for an example lithium-ion battery, the operating zone (e.g., charge curve) can be defined by a current limit of 10 amps, a power limit of 2.4 kilowatts, and a voltage limit of 400 volts with a linear rampdown beginning at 380 volts (e.g., a 20-volt voltage delta).

Figure 9A:
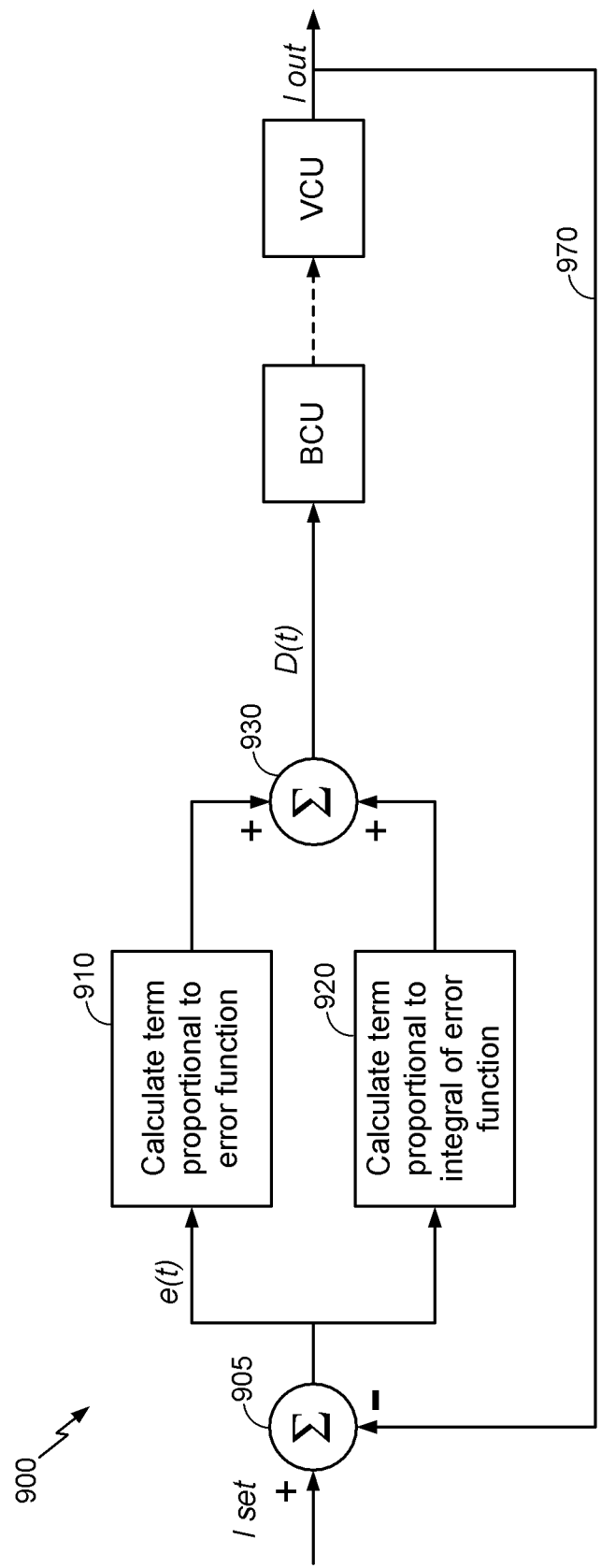
FIGS. 9A-9C schematically illustrate example proportional-integral (PI) controllers for controlling the base current of the power transmitter in accordance with certain embodiments described herein.
Figure 9B:
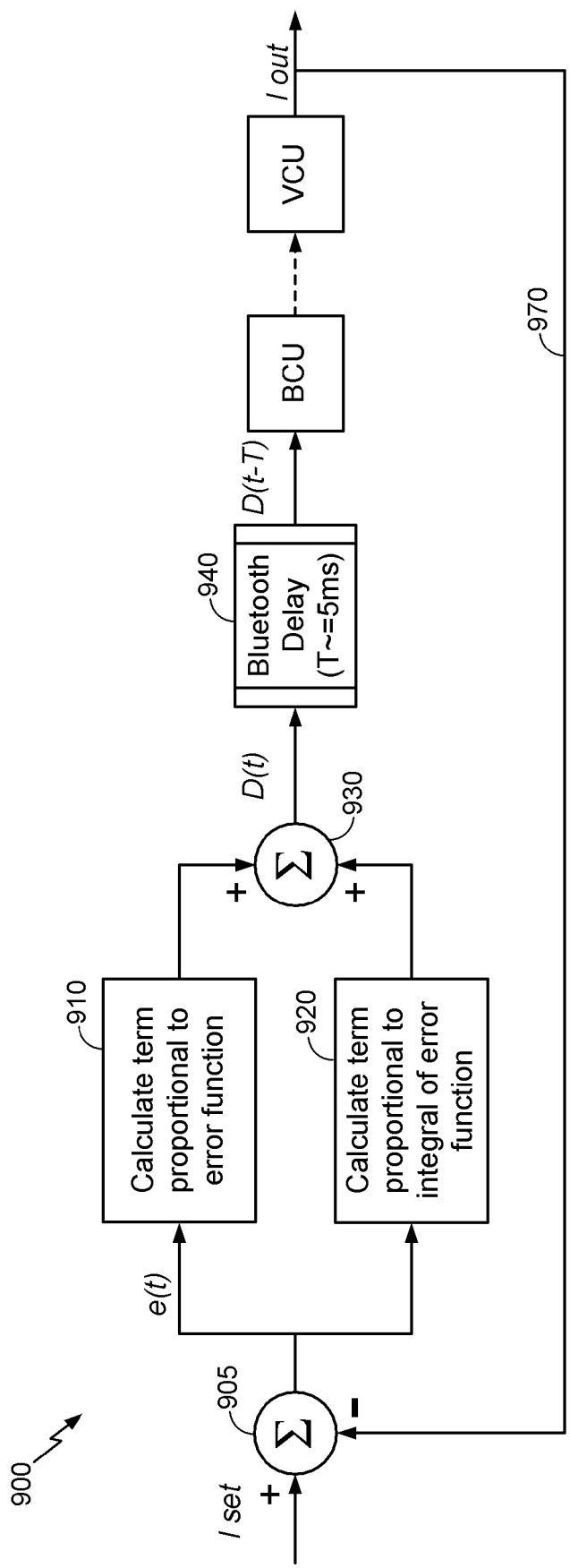
Figure 9C:
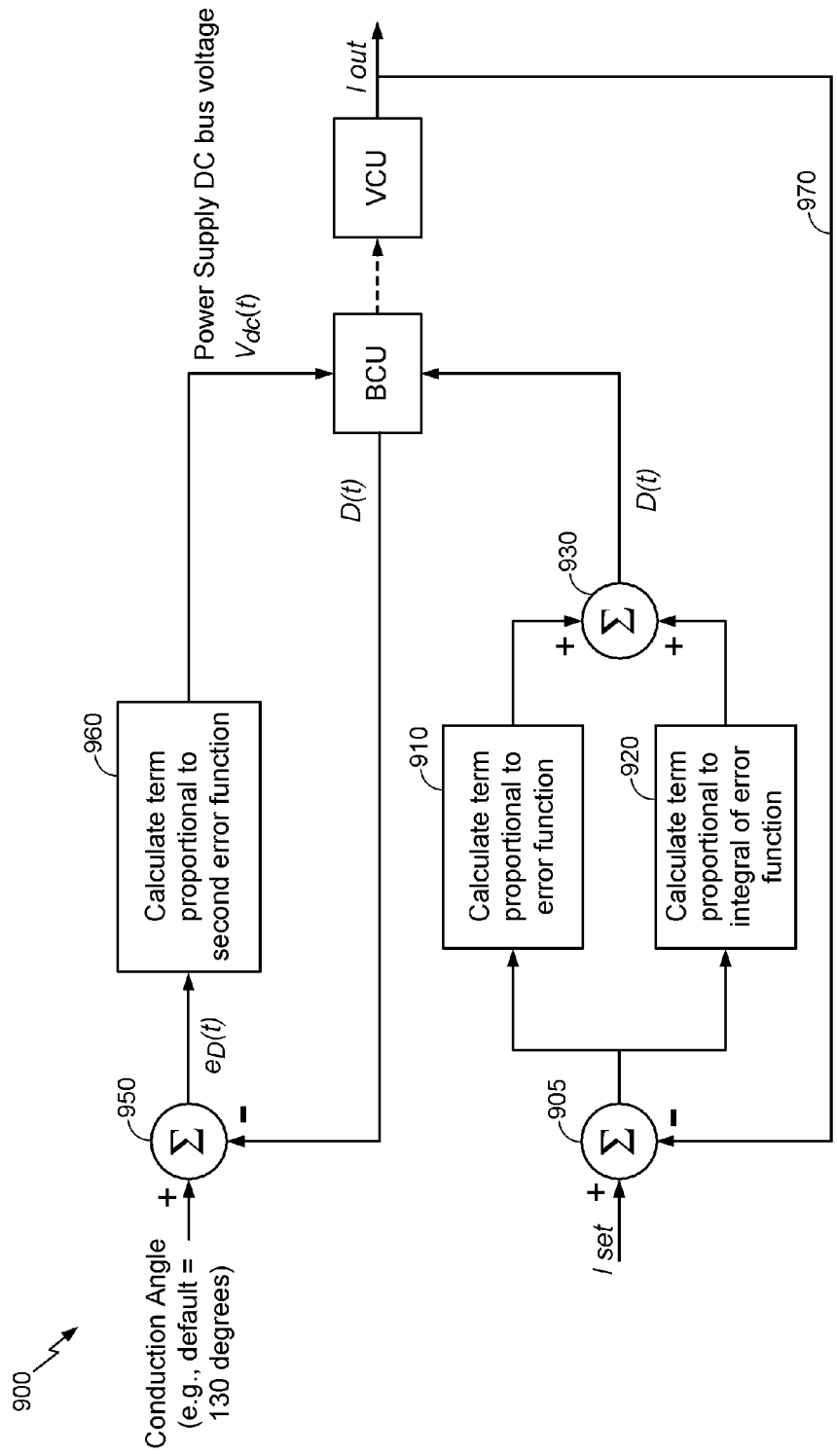

FIGS. 9A-9C schematically illustrate example proportional-integral (PI) controllers 900 for controlling the base current of the power transmitter in accordance with certain embodiments described herein. The PI controller 900 calculates an error function e(t) equal to a difference between the output current of the power receiver (e.g., the current provided to the load) and a predetermined current value (e.g., a setpoint selected by the controller). The error function can be calculated in a module 905, as shown schematically in FIGS. 9A-9C. The PI controller 900 also calculates a process function D(t) equal to the sum of a first term proportional to the error function and a second term proportional to an integral of the error function over a time interval. The first term can be calculated in a module 910, the second term can be calculated in a module 920, and the sum of the first term and the second term can be calculated in a module 930, as shown schematically in FIGS. 9A-9C. For example, the process function D(t) can take the following form:

$$D(t) = K_p(I_r(t-T) - I_{out}(t-T)) + K_i \int_0^t (I_{set}(\tau-T) - I_{out}(\tau-T)) d\tau. \quad \text{Eq. 1}$$

Using the calculated value of the process function (e.g., varying the base current so as to reduce the value or providing the value to the current source of the base controller unit or BCU), the PI controller 900 can control the output current by adjusting the base current. For example, the output current can be maintained at a predetermined current value (e.g., a setpoint less than or equal to a maximum output current). In certain embodiments, varying the base current is done iteratively (e.g., adjusting the base current towards a calculated setpoint, recalculating the value of the process function and/or the setpoint to determine a next adjustment of the base current towards the setpoint, and repeating until the base current equals the setpoint or approximates the setpoint within a predetermined range). The example PI controller 900 of FIG. 9B includes a "Bluetooth delay" (e.g., about 5 milliseconds) which limits the bandwidth (e.g., to 250 Hz), and which can be applied by a module 940. The example PI controller 900 of FIG. 9C includes an additional control loop (e.g., having a 20 Hz bandwidth) that adjusts the DC bus voltage of the power transmitter in response to the value of the process function D(t) and using the conduction angle (e.g., bridge phase angle), which is discussed more fully below. In response, the controller 900 calculates a second error function $e_D(t)$ and uses its integral over a time period to set the DC bus voltage $V_{DC}(t)$. For example, as schematically shown in FIG. 9C, the second error function can be calculated by a module 950 and a term proportional to the second error function can be calculated by a module 960.

The example PI controllers 900 of FIGS. 9A-9C each receives at least one signal 970 indicative of the output current and adjusts the base current to control the output current to be within a predetermined range (e.g., at the setpoint). In certain other embodiments, the PI controller 900 is configured to adjust the base current to implement the different modes of operation compatible with the predetermined operating zone (e.g., the charge curves) of the load. For example, the at least one signal 970 received by the controller 900 from the power receiver can be further indicative of at least one of an output voltage of the power receiver or an output power of the power receiver, and the controller 900 can control the base current such that the power receiver is within the predetermined operating zone (e.g., the charge curves) defined at least by a maximum current, a maximum output voltage, or a maximum output power. Other operating parameters that can be used as control variables include, but are not limited to, power factor correction (PFC) DC voltage (PFC $V_{dc}$) of the power transmitter, the bridge phase angle or current, current generated by a selected one or more coils of the power receiver (e.g., quadrature $I_{sc}$, DD $I_{sc}$), phase angle of a selected one or more coils of the power receiver (e.g., quadrature phase, DD phase), thermal measurements of the power transmitter, input AC current or frequency, input power, efficiency, and operating frequency.

Figure 10:
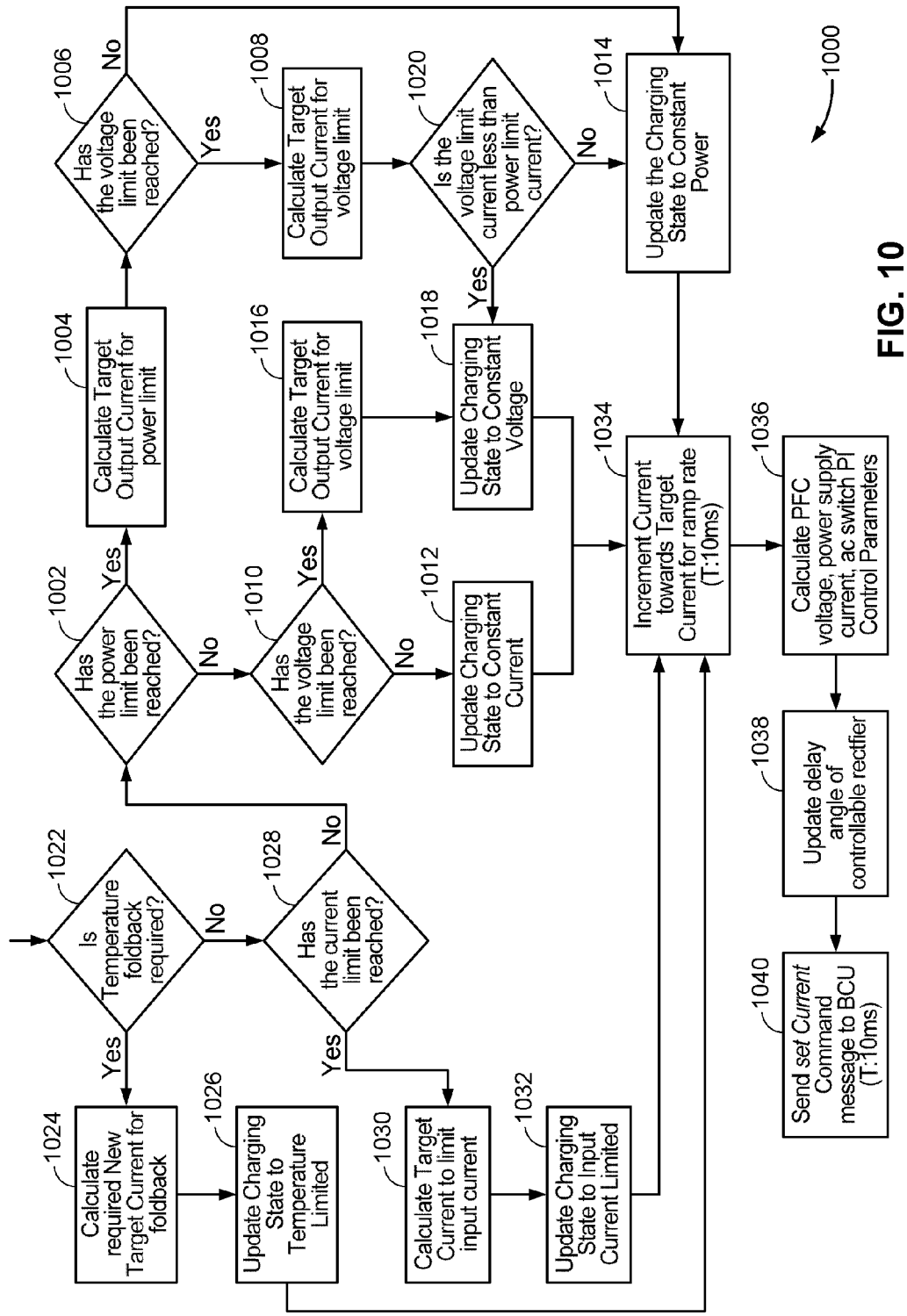
FIG. 10 is an example flow diagram compatible with certain such embodiments in which the controller regulates the base current in response to signals that are further indicative of at least one of the output voltage or the output power of the power receiver.

FIG. 10 is an example flow diagram of a method 1000 compatible with certain such embodiments in which the controller 900 regulates the base current in response to signals that are further indicative of at least one of the output voltage or the output power of the power receiver. Knowledge of the values of two of these operating parameters can be used to calculate the third of these operating parameters (e.g., using the relation P=IV). For example, using signals indicative of the output current and the output voltage, the controller 900 can calculate the output power. In certain embodiments, the controller 900 is configured to calculate, in response to the signals received from the power receiver, a setpoint for the base current in which the operating parameters are all within the predetermined operating zone. This setpoint can be selected by the controller 900 to be the largest value of the base current that results in the operating parameters each being within the predetermined operating zone. The controller 900 further adjusts the base current towards the calculated setpoint. For example, if the signals received from the power receiver are indicative of the output current and output voltage resulting in an output power exceeding the power limit value, the controller 900 can regulate the base current to reduce the base current until the output power is below the power limit value.

As shown in the example flow diagram of the method 1000 of FIG. 10, the controller 900 determines whether an output power limit of the power receiver has been reached (e.g., whether the output power is greater than a predetermined maximum output power of the operating zone) in an operational block 1002. If the output power limit has been reached, the controller 900 calculates a first target current value corresponding to the maximum output power of the operating zone in an operational block 1004. The controller 900 further determines whether an output voltage of the power receiver has been reached (e.g., whether the output voltage is greater than a predetermined maximum output voltage of the operating zone) in an operational block 1006. If the output voltage limit has been reached, the controller 900 calculates a second target current value corresponding to the maximum output voltage of the operating zone in an operational block 1008.

If neither the maximum output power nor the maximum output voltage has been reached (e.g., upon checking the output power in the operational block 1002 and the output voltage in an operational block 1010), the controller 900 updates the charging state to a constant current state (e.g., adjusts the base current towards the setpoint current value) in an operational block 1012. If the output power is greater than the maximum output power and the output voltage is not greater than the maximum output voltage, then the controller 900 updates the charging state to a constant power state (e.g., adjusts the base current towards the first target current value) in an operational block 1014. If the output power is not greater than the maximum output power and the output voltage is greater than the maximum output voltage, then the controller 900 calculates the second target current value corresponding to the maximum output voltage of the operating zone in an operational block 1016 and updates the charging state to a constant voltage state (e.g., adjusts the base current towards the second target current value) in an operational block 1018. If the output power is greater than the maximum output power and the output voltage is greater than the maximum output voltage, and the first target current is less than or equal to the second target current (e.g., upon checking in an operational block 1020), then the controller 900 updates the charging state to a constant power state (e.g., adjusts the base current towards the first target current value) in the operational block 1014. If the output power is greater than the maximum output power and the output voltage is greater than the maximum output voltage, and the first target current is greater than the second target current (e.g., upon checking in the operational block 1020), then the controller 900 updates the charging state to a constant voltage state (e.g., adjusts the base current towards the second target current value) in the operational block 1018.

The method 1000 of FIG. 10 that can be practiced by the controller 900 further regulates the base current in response to a signal that is indicative of a temperature of the power transmitter. The controller 900 determines whether temperature foldback (e.g., reduction) is required (e.g., whether the temperature is above a predetermined maximum temperature value) in an operational block 1022. If the temperature is above the maximum temperature value, the controller 900 calculates a new setpoint value (e.g., reduced by a factor of two) in an operational block 1024 and updates the charging state to a temperature limited state (e.g., adjusts the base current to the new setpoint value) in an operational block 1026. If the temperature is below or equal to the maximum temperature value, the controller 900 proceeds with controlling the base current. If the controller 900 determines that the temperature foldback is not required, the controller 900 determines whether an output current limit of the power receiver has been reached (e.g., whether the output current is greater than a predetermined maximum output current of the operating zone) in an operational block 1028, calculates a target current value corresponding to the maximum output current of the operating zone in an operational block 1030, and updates the charging state to a current limited state in the operational block 1032.

FIG. 10 also shows operational blocks for adjusting the base current once the charging state is determined that may be included in the method 1000 in certain embodiments. These operational blocks include, but are not limited to, incrementing the base current towards the target current with a ramp rate (e.g., changing the base current at a predetermined speed) in the operational block 1034, calculating a power factor correction (PFC) voltage, power supply current, and AC switch PI controller parameters (e.g., using these operational parameters for further adjustment of the base current) in an operational block 1036, updating a delay angle of a controllable rectifier in an operational block 1038, and sending a "set current" command message to the base controller unit (BCU) (e.g., with a delay time of 10 milliseconds) in an operational block 1040.

Figure 11:
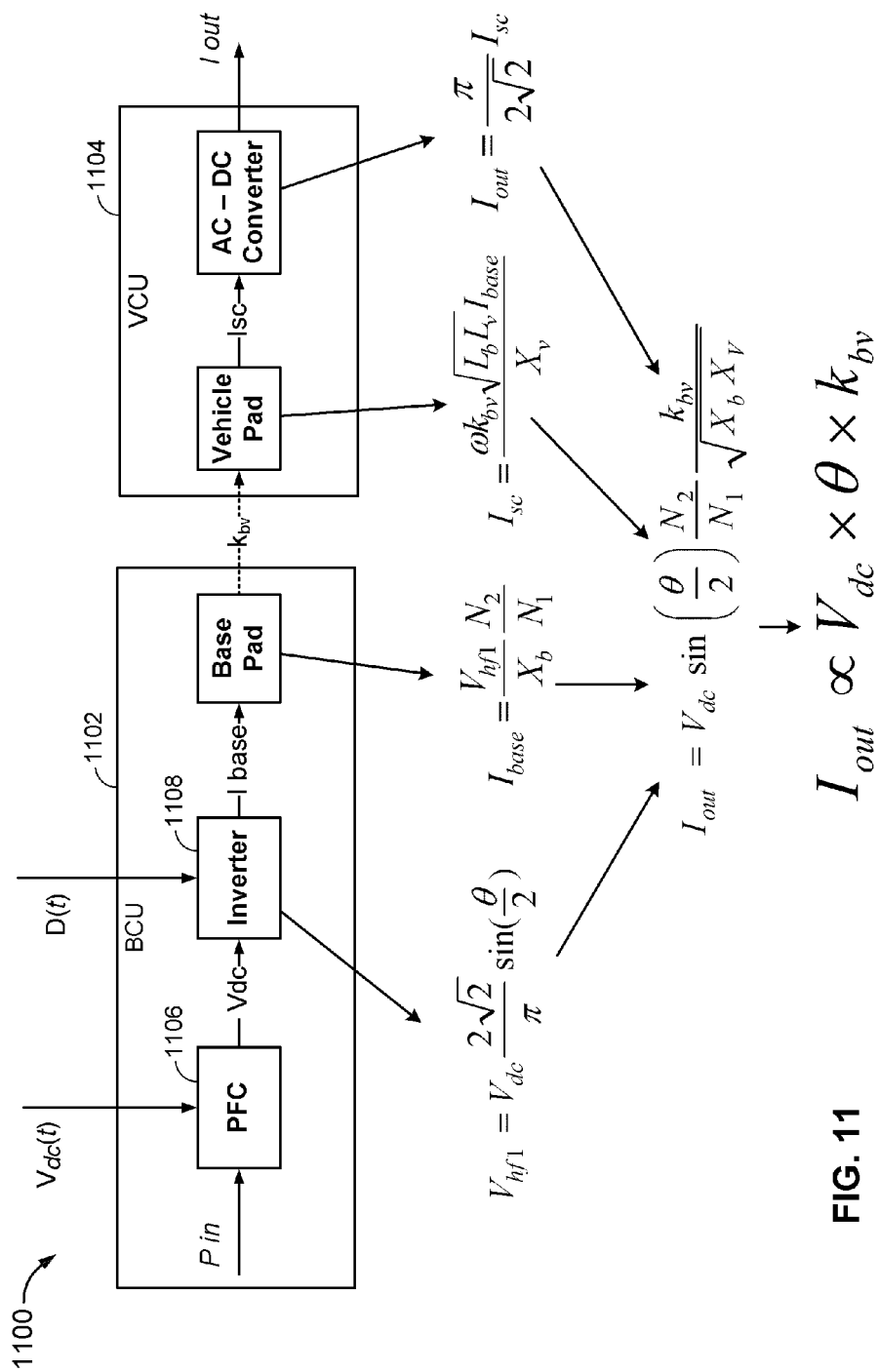
FIG. 11 schematically illustrates a portion of the power transmitter (e.g., BCU) and a portion of the power receiver (e.g., vehicle controller unit or VCU) in accordance with certain embodiments described herein.

FIG. 11 schematically illustrates a portion 1102 of the power transmitter (e.g., BCU) and a portion 1104 of the power receiver (e.g., vehicle controller unit or VCU) in accordance with certain embodiments described herein. The BCU comprises a PFC module 1106 which can be used to avoid excessive currents from the utility grid due to out of phase voltage and current, to avoid harmonic distortion due to other portions of the circuitry (e.g., switching action of a rectifier), and to filter the utility power at 50/60 Hz. The DC voltage from the PFC module 1106 can be supplied to an inverter module 1108, the output of which can be referred to as a bridge current or base current. The magnitude of the fundamental of the output of the inverter module 1108 is dependent on the DC voltage received from the PFC module 1106 and the conduction angle θ (which can take any value from 0° to 180°) of the inverter bridge according to the following equation:

$$V_i = \frac{4V_{DC}}{\pi} \sin\left(\frac{\theta}{2}\right).$$ Eq. 2

The conduction angle θ generally corresponds to a duty cycle. Higher conduction angles correspond to more time that power is being delivered. A lower conduction angle translates to lower voltage and higher current for the same power. Lower conduction angles require higher currents. In some implementations, the inverter module 1108 operates at conduction angles over 90°. Avoiding lower conduction angles and their associated higher currents can reduce component stress. If the inverter module 1108 is run at substantially 130°, then the total harmonic distortion (THD) of the output voltage may be reduced. As the inverter module 1108 increases the conduction angle from 120° to approximately 130°, third order harmonics increase as fifth order harmonics decrease. THD does not vary much between 120° and 130°, and increases slowly as it approaches 140°. Some implementations operate in the range of 115° to 140°.

As shown in FIG. 11, the output current from the power receiver is proportional to the DC bus voltage ($V_{dc}$), the conduction angle θ, and the coupling coefficient $k_{bv}$ between the power transmitter and the power receiver. In addition, FIG. 11 shows that the reactance $X_v$ of the power receiver is a factor in the output current, as will be discussed further below.

Figure 12:
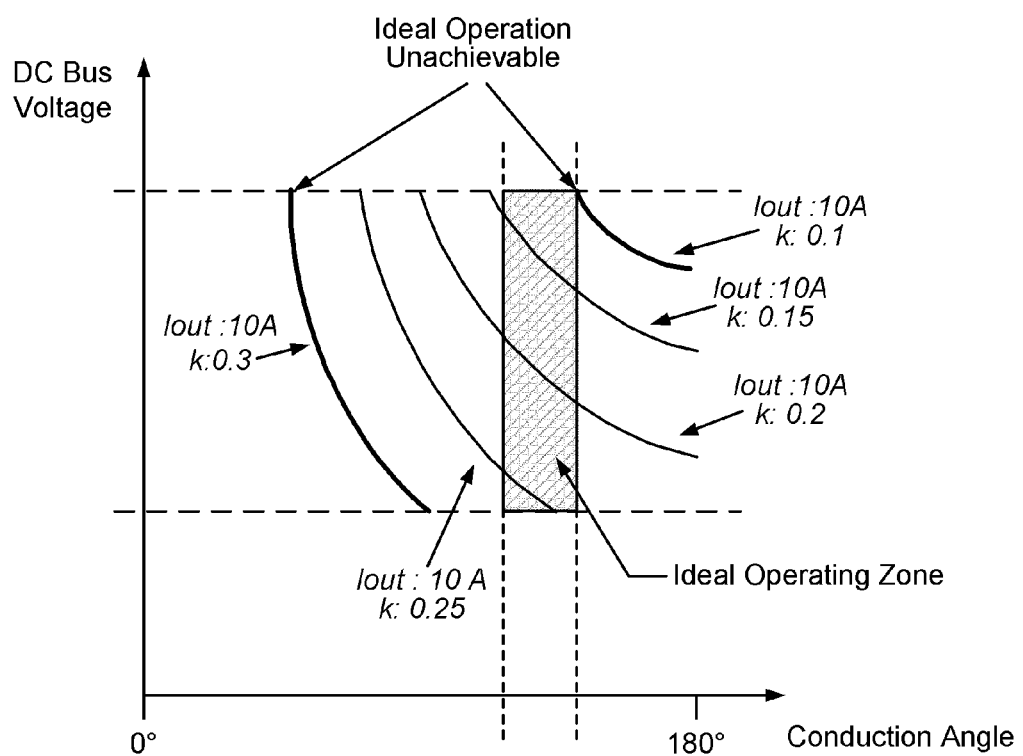
FIG. 12 is a plot showing an example selected operating zone of the inductive power transfer (IPT) system in accordance with certain embodiments described herein.

FIG. 12 is a plot showing an example selected operating zone of the inductive power transfer (IPT) system in accordance with certain embodiments described herein. While the selected operating zone of FIG. 12 is labeled using the term "ideal," as used herein, the term "ideal" is meant to signify that the "ideal" operating zone is one of many operating zones which provides satisfactory operation of the IPT system, but that the operation in the "ideal" operating zone is better in some way than in some other zones of operation. Use of the term "ideal" in FIG. 12 does not imply that operation of the IPT system or the power receiver is necessarily optimized or maximized in the selected operating zone, but in certain embodiments, the operating zone may be selected to optimize or maximize operation of the IPT system or the power receiver (e.g., charging of the battery).

The example selected operating zone can be defined by a range of DC bus voltages and a range of H-bridge conduction angles, as shown in FIG. 12. For example, the selected operating zone can be defined to have the range of DC bus voltages (e.g., between the two values indicated by the horizontal dashed lines), and the range of conduction angles (e.g., between the two values indicated by the vertical dashed lines). As shown in FIG. 11, the output current is dependent upon the DC bus voltage, the conduction angle, and the coupling coefficient. It is desirable to select the values of DC bus voltage, conduction angle, and coupling coefficient to achieve a selected value of the output current while being in the selected operating zone. For example, for an example output current of 10 amps, there are various combinations of values of the DC bus voltage, conduction angle, and coupling coefficient that fall within the selected operating zone. However, for some values of the coupling coefficient, none of the values of the DC bus voltage and the conduction angle which result in an output current of 10 amps is within the selected operation zone. For example, for coupling coefficients of 0.15, 0.2, and 0.25, the DC bus voltage and conduction angle values that result in an output current of 10 amps intersect the selected operating zone, but for coupling coefficients of 0.1 or 0.3, there are no values of these operation parameters that result in an output current of 10 amps while intersecting the selected operating zone. Therefore, it can be desirable to vary the coupling coefficient between the power transmitter and the power receiver to be able to provide a selected output current while being in a selected operating zone.

In an IPT system, the level of coupling between the transmitter and receiver circuits may determine the output current for a given base current. The level of coupling is indicated by the coupling coefficient k, which may be determined at least in part by geometric factors such as the alignment of the inductors in the transmitter and receiver circuits and the distance between the inductors. These factors may vary between charging events, for example, depending on the positioning of the wireless power receiver. Therefore, the coupling coefficient k may also vary between charging events.

The power transmitter and the power receiver may be inductively coupled to one another by induction coils of various configurations (see, e.g., FIGS. 5A-5C). The induction coils may be referred to or configured as "loop" antennas, and more specifically, multi-turn loop antennas. The induction coils may also be referred to herein or be configured as "magnetic" antennas. The coil may also be referred to as an "antenna" of a type that is configured to wirelessly output or receive power. As used herein, induction coils are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferrimagnetic materials may allow development of a stronger electromagnetic field and improved coupling.

In this specification, the term "coil" is used in the sense of a localized winding arrangement having a number of turns of electrically conducting material that all wind around one or more central points. The term "coil arrangement" is used to mean any winding arrangement of conducting material, which may comprise a number of "coils."

Efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

According to some embodiments, the near field may correspond to a region around the induction coil in which electromagnetic fields exist. Near-field coupling-mode regions may correspond to a volume that is near the physical volume of the induction coil, typically within a small fraction of the wavelength. According to some embodiments, electromagnetic induction coils, such as single and multi-turn loop antennas, are used for both transmitting and receiving since magnetic near field amplitudes in practical embodiments tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

FIG. 13 is a perspective view illustration of induction coils used in an IPT system 1300 in accordance with certain embodiments described herein. The IPT system 1300 comprises a base or transmitter which includes transmitter coil arrangement 1301 and a pick-up or receiver which includes receiver coil arrangement 1302. Only the coils of the system 1300 are shown in FIG. 13 for clarity purposes. The system 1300 may include one or more additional components as described herein. For the purposes of this specification, it may be assumed that the coils in FIG. 13 are viewed in the longitudinal direction (e.g., relative to the electric vehicle). FIG. 13 shows receiver coils 1302 positioned over transmitter coils 1301, a position suitable for wireless power transfer between the transmitter and receiver coils 1301 and 1302 upon energizing the transmitter coils 1301.

In the configuration of FIG. 13, transmitter coils 1301 comprise two substantially co-planar transmitter coils 1303a and 1303b connected to one or more power sources (not shown). In an embodiment, electric current flows in the same direction in the adjacent portions of the two coils 1303a and 1303b and the current in these adjacent portions has substantially the same magnitude and phase.

Receiver coils 1302 comprise two substantially co-planar receiver coils 1304a and 1304b (e.g., which can be termed "DD coils") and a third coil 1305 (e.g., which can be termed a "quadrature coil" or "QD coil") positioned over the co-planar receiver coils 1304a and 1304b. The coils in coil arrangement 1302 may be connected to a battery (e.g., of an electric vehicle) to which they are configured to supply a charging current.

Both transmitter and receiver coil arrangements 1301 and 302 are associated with magnetically permeable members such as ferrite cores (not shown) positioned under the transmitter coils 1301 and above the receiver coils 1302 (see, e.g., FIGS. 5A-5C). To transfer power using the coils 1301 and 1302 of FIG. 13, an alternating electric current is passed through the transmitter coils 1301. This creates a magnetic field in the form of a "flux pipe," a zone of high flux concentration, looping above coil arrangement 1301 between the holes in transmitter coils 1303a and 1303b. In use, receiver coils 1302 are positioned such that the DD coils 1304a, 1304b and the QD coil 1305 intersect the lines of magnetic flux, thus inducing electric current in the DD coils 1304a, 1304b and the QD coil 1305, which can be supplied to the battery of the electric vehicle.

The co-planar DD coils 1304a and 1304b extract power from the horizontal components of magnetic flux generated by the transmitter coils 1301. The single QD coil 1305 extracts power from the vertical component of the magnetic flux generated by the transmitter coils. Thus, in combination, the coils of receiver coils 1302 enable energy transfer between the transmitter and receiver devices of the wireless power transfer system to a reasonably efficient degree.

Figure 14A:
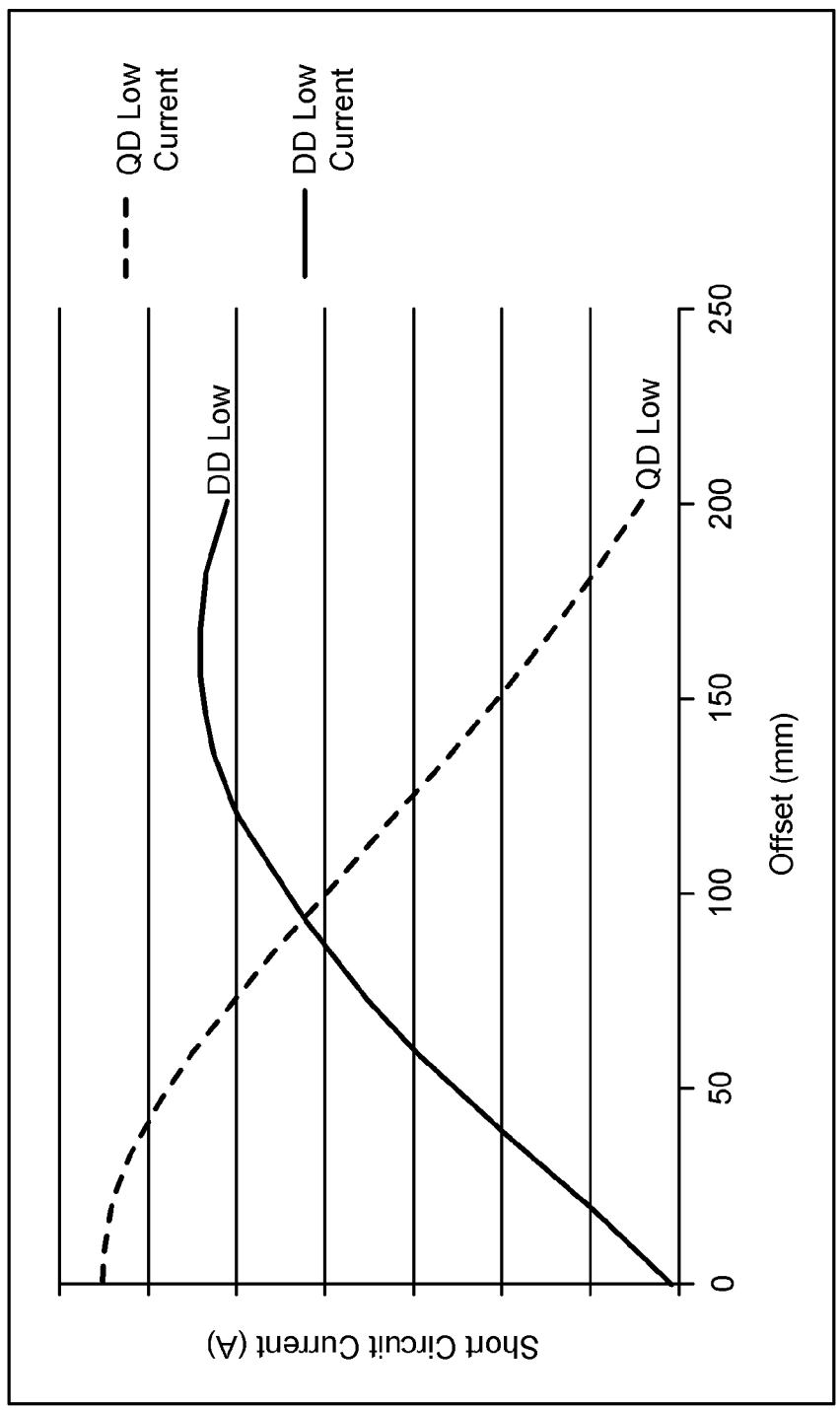
FIG. 14A is a plot of example short circuit currents for the DD coils and the QD coil for various lateral offsets of these receiver coils from a position directly above and centered on the transmitter coils.

FIG. 14A is a plot of example short circuit currents for the DD coils and the QD coil for various lateral offsets of these receiver coils from a position directly above and centered on the transmitter coils. The measurement of the short circuit current across each inductive element (e.g., the QD coil and the DD coils) can be achieved by selectively closing both the switches in the sub-circuit nearest the inductive element, for example, closing switches $S_1$ and $S_2$ in the coupling circuit of FIG. 15B, thereby shorting the coupling circuit. For a given base current in the primary inductor of the power transmitter, the short circuit current across the inductive element can be indicative of the level of coupling between the inductive element and the power transmitter. Any appropriate means of measuring the short circuit current may be used.

Figure 14B:
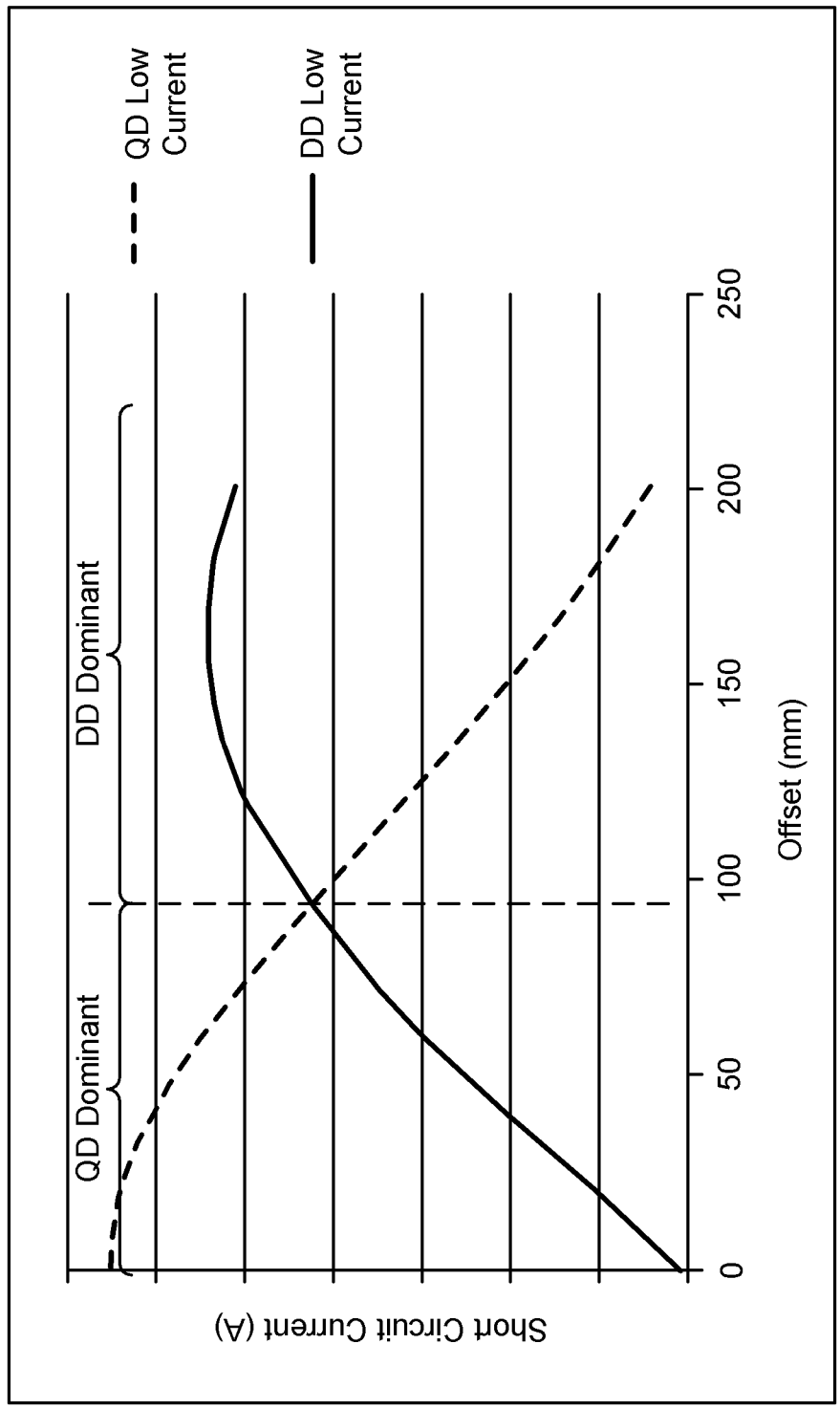
FIG. 14B is the plot of FIG. 14A with an example demarcation line between the QD coil being dominant and the DD coils being dominant at a lateral offset value that is at the crossing point of the two curves.

The current inductively generated by the QD coil is at a maximum when the receiver coils have zero lateral offset relative to the transmitter coils, and falls off with increasing lateral offset. The current inductively generated by the DD coils is at a minimum when the receiver coils have zero lateral offset relative to the transmitter coils, and increases with increasing lateral offset, to a maximum at approximately 160 mm, and then falls off with further increasing lateral offset. In other words, the coupling coefficients of the DD coils and of the QD coil are different from one another for most values of the lateral offset (the curves do intersect one another at a lateral offset value of about 90 mm). At a first range of lateral offsets (e.g., less than 90 mm), the QD coil can be denoted as "dominant" and the DD coils can be denoted as "recessive," since the current generated by the QD coil is greater than that of the DD coils for the first range of lateral offsets. At a second range of lateral offsets (e.g., at 90 mm and above), the DD coils can be denoted as "dominant" and the QD coil can be denoted as "recessive," since the current generated by the QD coil is less than that of the DD coils for the second range of lateral offsets. FIG. 14B is the plot of FIG. 14A with an example demarcation line between the QD coil being dominant and the DD coils being dominant at a lateral offset value that is at the crossing point of the two curves. In certain embodiments, the power receiver comprises sensors configured to measure the short circuit current in each of the inductive elements and determine which of the inductive elements is dominant and which is recessive.

Figure 14C:
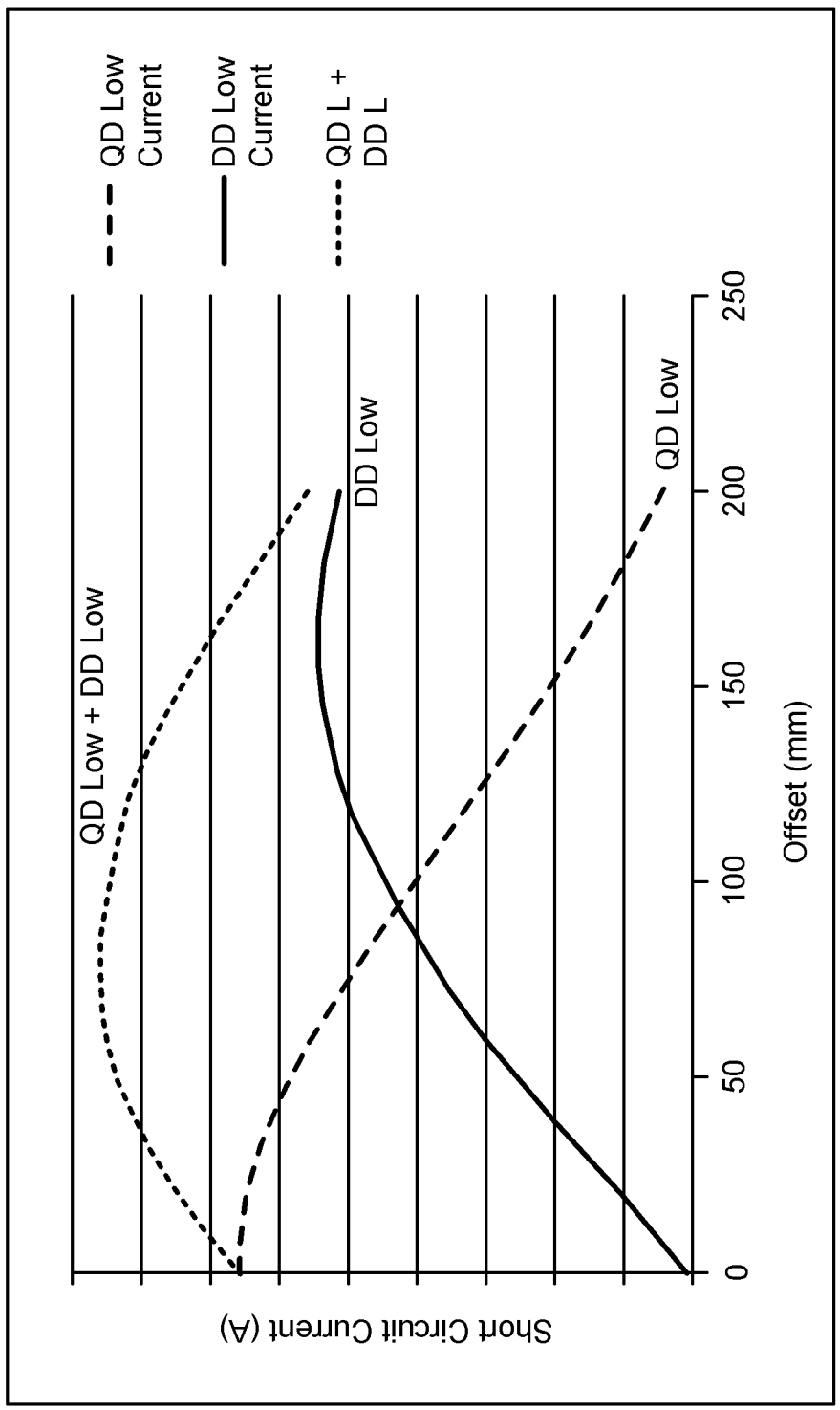
FIG. 14C is a plot of the example currents for the DD coils and the QD coil of FIG. 14A, along with their sum.

FIG. 14C is a plot of the example currents for the DD coils and the QD coil of FIG. 14A, along with their sum. By selecting whether the current generated by the QD coil, the DD coils, or both the QD coil and the DD coils are used to supply current to the load, the effective coupling coefficient of the system can be selected among three values for most values of the lateral offset. The configuration in which current only generated by the QD coil is used can be considered as a first coupling state, the configuration in which current only generated by the DD coils is used can be considered as a second coupling state, and the configuration in which current from both the QD coil and the DD coils is used can be considered to be a third coupling state. This method for selecting the coupling state can be used to provide a coupling coefficient for which the DC bus current and the conduction angle can be selected to be within the selected operation zone.

However, for many of these lateral offset values, the differences between these three effective coupling coefficients can be large, such that all three of the effective coupling coefficients miss the selected operation zone (see, e.g., FIG. 12). Thus, it can be desirable to have further granularity in the selection of the effective coupling coefficient.

Figure 15E:
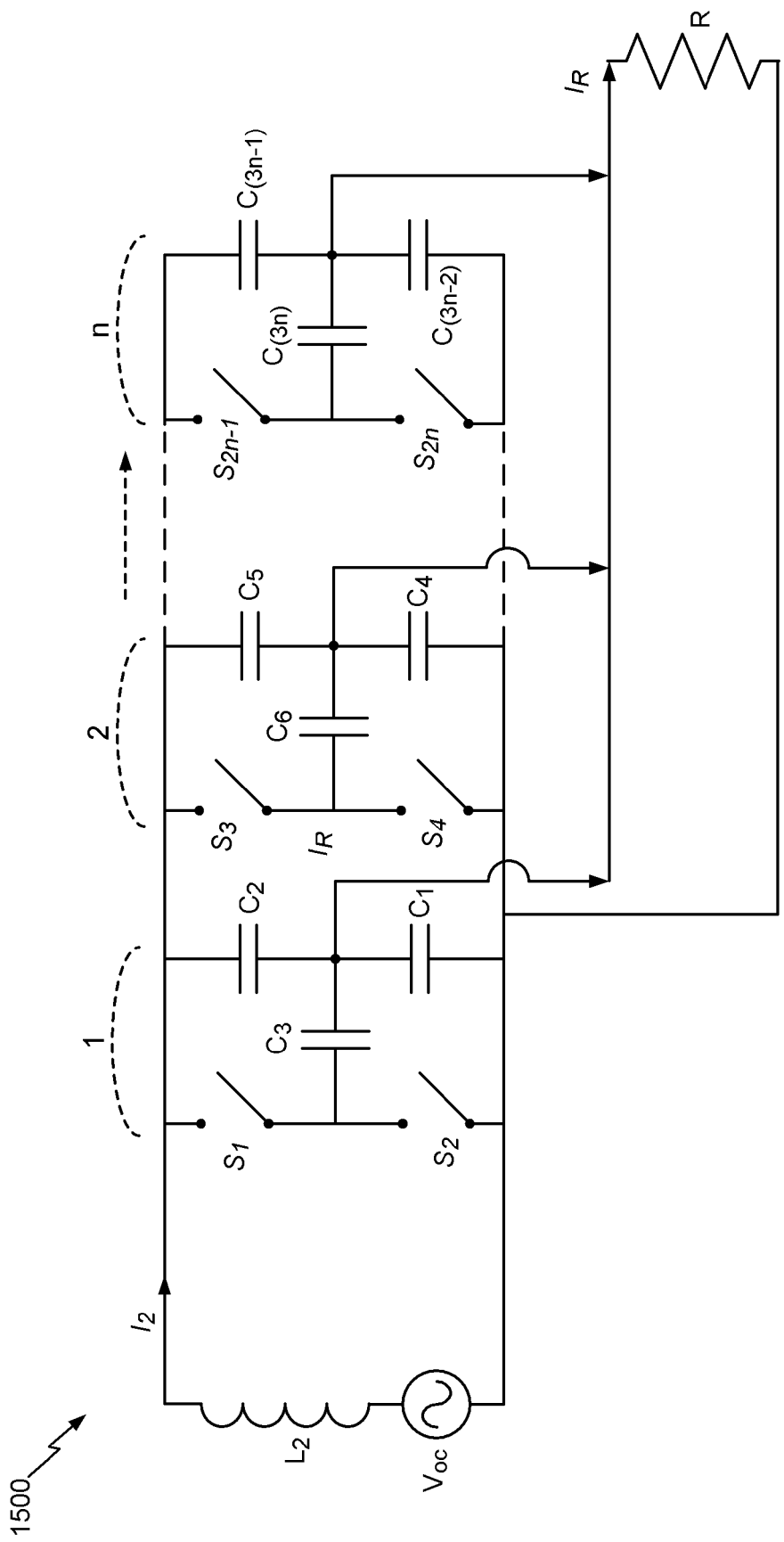

FIGS. 15A-15E schematically illustrate an example coupling circuit 1500 of the power receiver in which a reactance of the power receiver can be varied in accordance with certain embodiments described herein. FIG. 15A is a schematic diagram of a receiver coupling circuit 1500 in which, through inductive coupling between the power transmitter and the receiver circuit, a voltage $V_{oc}$ is induced in inductive element $L_2$. This voltage is represented by voltage source $V_{oc}$ in FIG. 15A. When an alternating current $I_1$ having a frequency $\omega$ is present in the base circuit of the power transmitter, the induced voltage in the coupling circuit of FIG. 15A is given by:

$$V_{oc} = j\omega I_1 k \sqrt{L_1 L_2} \qquad \text{Eq. 3}$$

The values of $C_1$ and $C_2$ may be chosen so that, with inductive element $L_2$, a tuned resonant circuit is formed at the frequency of the alternating base circuit current $I_1$. To achieve tuning in the coupling circuit shown in FIG. 15A, the values of $C_1$, $C_2$, and $L_2$ may be related:

$$\omega L_2 = \left( \frac{C_1 + C_2}{\omega C_1 C_2} \right) \qquad \text{Eq. 4}$$

The output current $I_R$ supplied to the load R may be given by:

$$I_R = V_{oc} \omega C_1 \qquad \text{Eq. 5}$$

It should be noted that the formulae used herein assume perfect tuning and ideal components as presented in the figures. In reality, there may be losses or minor residual effects that cause the true values to differ from the ideal case. However, the formulae provide values that approximate the real values and usefully illustrate relationships between variables.

The values of capacitances $C_1$ and $C_2$ may be varied in order to vary the output current for a given base current and a given level of coupling. However, varying $C_1$ and $C_2$ may further affect the tuning of the coupling circuit, which may reduce the efficiency of power transfer at the resonant frequency. It may therefore be desirable to vary the partial series or parallel capacitance while keeping the coupling circuit tuned.

In certain embodiments, the receiver coupling circuit 1500 can be configured to respond to control signals from a controller to selectively connect capacitive elements in the power receiver circuit to enable the reactance $X_v$ of the coupling circuit, and hence the output current (see, e.g., FIG. 11), to be varied for a given level of coupling, thus enabling the coupling circuit to selectively deliver the particular output current, while the resonant frequency at which inductive element $L_2$ is tuned remains substantially the same for different configurations of the capacitive elements.

FIG. 15B is a schematic diagram of an example switchable coupling circuit 1500 in accordance with certain embodiments described herein. The coupling circuit 1500 includes an inductive element $L_2$ in which a voltage $V_{oc}$ is induced by means of resonant inductive coupling from an inductive element of a power transmitter (not shown). The induced voltage is shown as an equivalent voltage source. The coupling circuit 1500 further comprises capacitive elements in the form of capacitors $C_1$, $C_2$, and $C_3$, respectively. The coupling circuit also includes switching elements $S_1$ and $S_2$. An output current $I_R$ is drawn from across capacitor $C_1$ to supply a load R, which is representative of a battery unit, and is depicted as being a resistive load of resistance R. In other embodiments, current $I_R$ may be supplied to directly power a load, or may be used to charge a battery unit and to power a load.

Capacitors $C_1$, $C_2$, and $C_3$ and switching elements $S_1$ and $S_2$ are connected such that switching elements $S_1$ and $S_2$ are connected in series and capacitors $C_1$ and $C_2$ are connected in series, with the two switching elements $S_1$ and $S_2$ being connected in parallel with the two capacitors $C_1$ and $C_2$. Capacitor $C_3$ is connected to bridge from between the two switching elements $S_1$ and $S_2$ to between capacitors $C_1$ and $C_2$.

Switches $S_1$ and $S_2$ can be opened and closed to configure the connection of capacitors $C_1$, $C_2$, and $C_3$ and the reactance presented to the inductor $L_2$ and thereby vary the output current $I_R$. FIG. 15C schematically illustrates a configuration in which switch $S_1$ of FIG. 15B is closed and switch $S_2$ is open, capacitors $C_2$ and $C_3$ are connected in parallel with each other and in series with capacitor $C_1$. In this configuration, the output current may be given by:

$$I_R = V_{oc} \omega C_1 \quad \text{Eq. 6}$$

FIG. 15D schematically illustrates another configuration in which switch $S_1$ of FIG. 15B is open and switch $S_2$ is closed. In this case, capacitors $C_1$ and $C_3$ are connected in parallel with each other and in series with capacitor $C_2$. In this configuration, the output current may be given by:

$$I_R = V_{oc} \omega (C_1 + C_3) \quad \text{Eq. 7}$$

In the configuration of FIG. 15C, the series reactance of the tuning circuit is lower, and the output current is lower. In the configuration of FIG. 15D, the series reactance is higher, and the output current is higher.

To maintain the tuning of the receive coupling circuit in both configurations discussed above, the reactance of both coupling circuits may be substantially equal. The reactance of the coupling circuit in which switch $S_1$ is closed and switch $S_2$ is open may be given by:

$$X_{high\ k} = \left( \frac{C_1 + C_2 + C_3}{\omega (C_2 + C_3) C_1} \right) \quad \text{Eq. 8}$$

The reactance of the coupling circuit in which switch 606 is open and switch 607 is closed may be given by:

$$X_{low\ k} = \left( \frac{C_1 + C_2 + C_3}{\omega (C_1 + C_3) C_2} \right) \quad \text{Eq. 9}$$

For these values of reactance to be equal, the relationship between $C_1$ and $C_2$ may be given by:

$$C_1 = C_2 \quad \text{Eq. 10}$$

In some embodiments, the capacitances of capacitors $C_1$ and $C_2$ may be substantially equal in order to be able to switch the coupling circuit between "high" and "low" current modes while maintaining the same reactance of the tuning circuit in both configurations. As a result, the coupling circuit may advantageously remain tuned and energy transfer may be improved.

FIG. 15E schematically illustrates an example coupling circuit 1500 in which multiple sub-circuits each comprise two switching elements and three capacitors are connected in parallel with one another. In the coupling circuit of FIG. 15E, the sub-circuit of switching elements and capacitors shown in FIG. 15B has been repeated n times, each connected in parallel to the other. As a result, the coupling circuit 1500 includes 2×n switching elements and 3×n capacitors. The capacitances of the capacitors may vary between the sub-circuits. The output current $I_R$ drawn by the load R is the sum of the output currents of each of the sub-circuits. To maintain the tuning of the coupling circuit in one or more configurations of the 2×n switching elements, the capacitors connected in series in sub-circuits may have equal capacitances such that $C_1 = C_2$, $C_4 = C_5$, $C_{(3n-2)} = C_{(3n-1)}$, etc. The number of different output currents that can be achieved by the coupling circuit of FIG. 15E through different combinations of open and closed switches for a given induced voltage $V_{oc}$ may be given by $2^n$. Therefore, the coupling circuit 1500 can be configured to provide many different levels of output current $I_R$ for a given induced voltage. In addition, the values of the capacitances in each of the sub-circuits can be selected to tailor spacings between each level of output current. For example, the capacitances can be selected to linearly space achievable output current levels, or more closely space the achievable output current levels where desirable. As another example, if efficiency is lost for small changes at certain levels, more capacitance configurations can be made to achieve output currents around that level. By using this level of configuration, an IPT system can select the configuration of capacitors that provides the output current giving an optimal efficiency for the parameters of the IPT system and circumstances of charging events, such as the alignment or distance between inductors which affects the coupling coefficient.

Figure 16A:
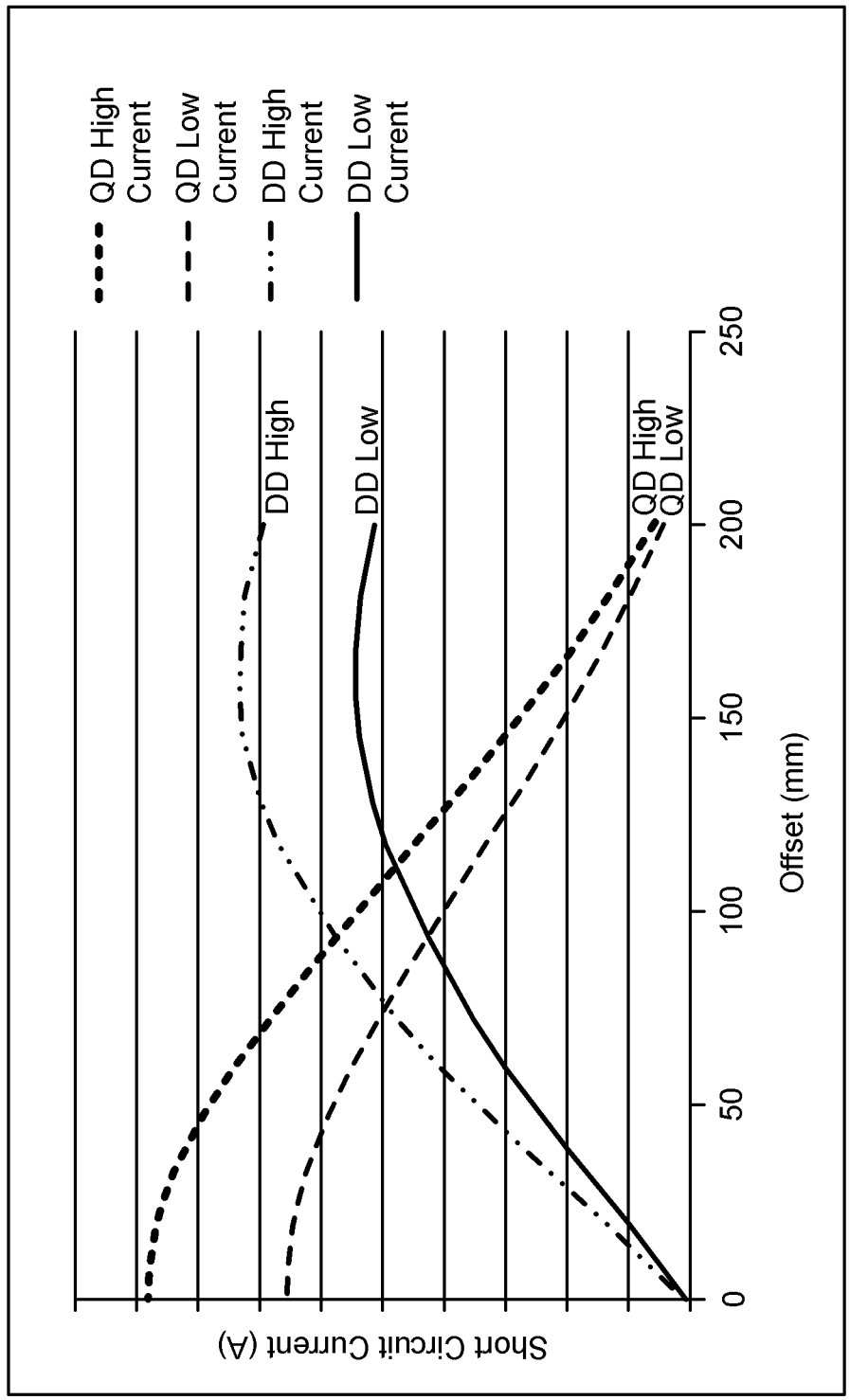
FIG. 16A is a plot of the various short circuit currents generated by each of the QD coil and the DD coils in two possible reactance states in accordance with certain embodiments described herein.
Figure 16B:
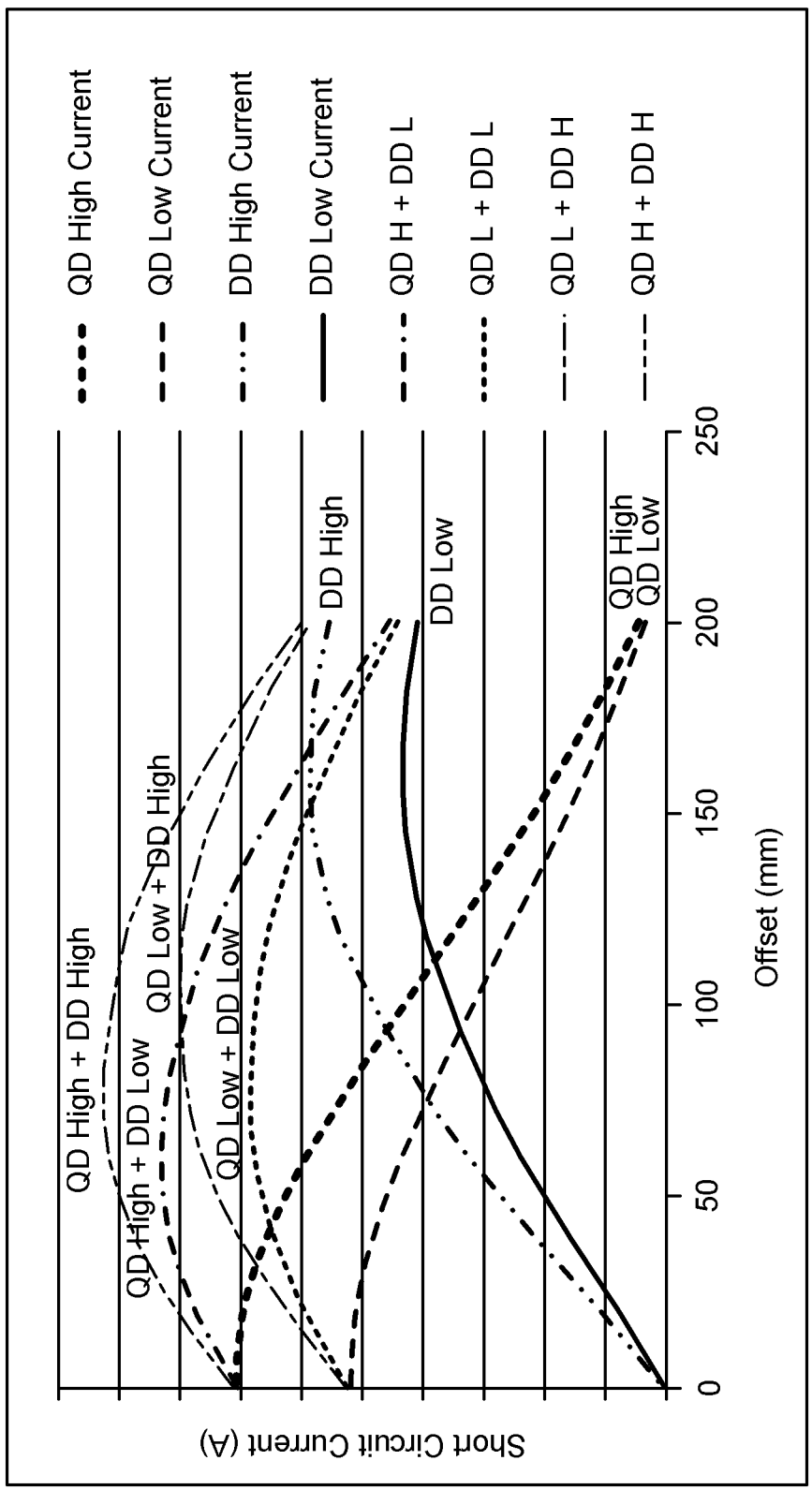
FIG. 16B is a plot of the various short circuit currents generated by the three coupling states of the QD coil and the DD coils in their two possible reactance states each, in accordance with certain embodiments described herein.

FIG. 16A is a plot of the various short circuit currents generated by each of the QD coil and the DD coils in two possible reactance states (e.g., "low" and "high," see e.g., FIGS. 15C and 15D) in accordance with certain embodiments described herein. FIG. 16B is a plot of the various short circuit currents generated by the three coupling states of the QD coil and the DD coils in their two possible reactance states each, in accordance with certain embodiments described herein. There are eight possible states (combinations of three coupling states and two reactance states), each having a different generated current as a function of the lateral offset.

In some embodiments, the power receiver comprises a plurality of inductive elements (e.g., the QD coil and the DD coils) configured to inductively generate current in response to a magnetic field generated by the power transmitter. The power receiver further comprises a coupling circuit operatively coupled to the plurality of inductive elements. The coupling circuit is configured to be selectively switched among a plurality of coupling states, with each coupling state having a corresponding set of inductive elements configured to provide current to the load. For example, the coupling circuit can be switched such that only the QD coil provides current to the load, only the DD coils provide current to the load, or both the QD coil and the DD coils provide current to the load. The coupling circuit is further configured to be selectively switched such that each inductive element of the set of inductive elements has a reactance state of a plurality of reactance states. For example, when only the QD coil provides current to the load, the coupling circuit can be switched such that the QD coil is either in the "high" reactance state or in the "low" reactance state. The power receiver further comprises a controller coupled to the coupling circuit and configured to respond to one or more signals indicative of one or more operating parameters of the power receiver, the power transmitter, or both, by selecting the coupling state and selecting the reactance state of each inductive element of the set of inductive elements.

The coupling state can be selected by the controller by opening and closing switching elements (e.g., relays or other electrically operated switches) of the coupling circuit of the power receiver that connect or disconnect the various inductive elements of the power receiver to the load. The reactance state can be selected by the controller by opening and closing the switching elements $S_1$ and $S_2$ (e.g., relays or other electrically operated switches) for the inductive elements connected to the load (see, e.g., FIG. 15B). The controller may use the exemplary logic described below to decide the appropriate switch configuration in different circumstances. The controller may comprise appropriate storage and processor means for determining a configuration of switching elements given measured system parameters. The controller may also close the switches corresponding to each inductive element to enable the short circuit current to be measured and subsequently switch the switches to the configuration for the selected coupling states and reactance states.

Figure 17:
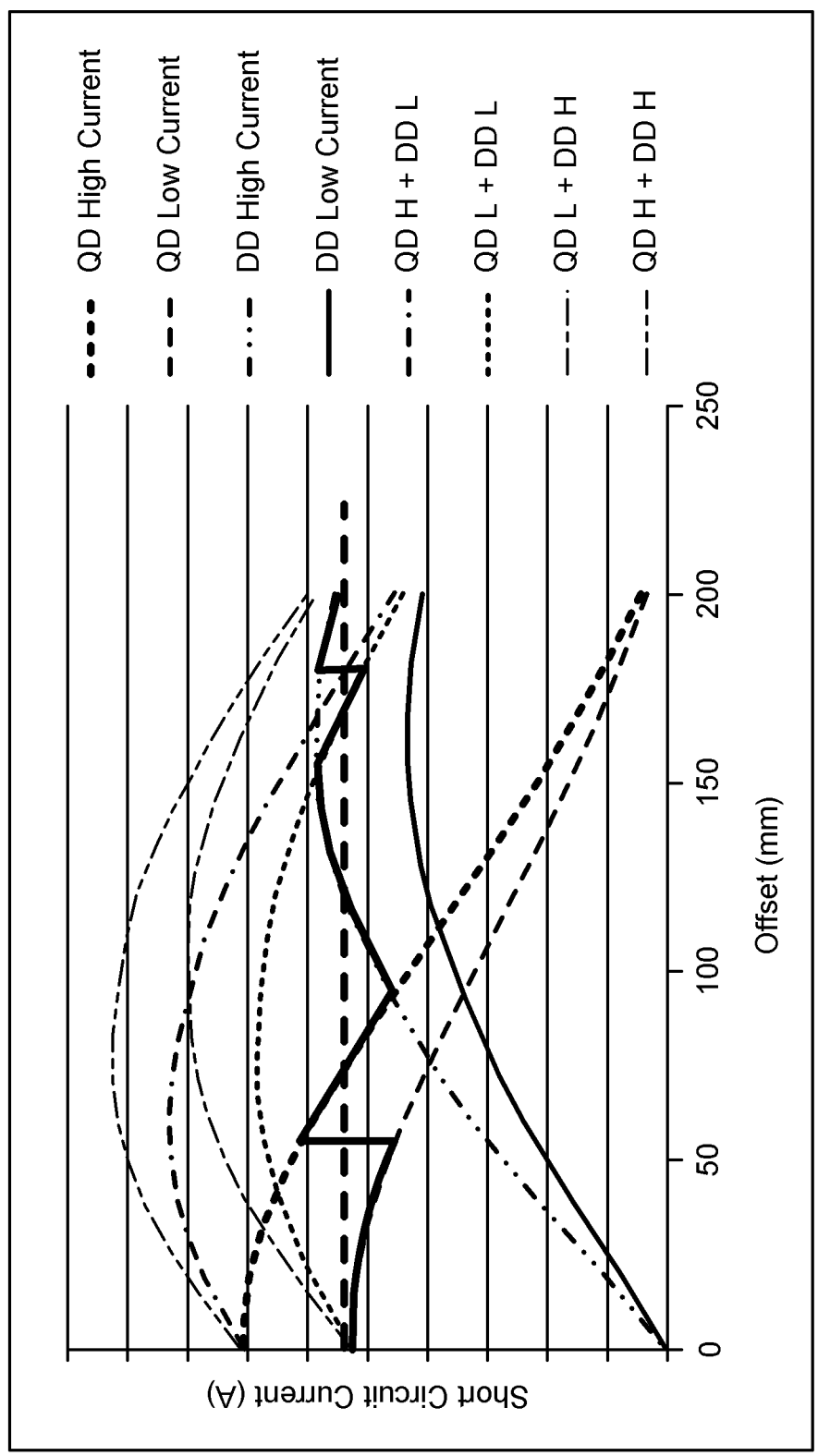
FIG. 17 is a plot of an example selection of coupling states and reactance states to approximate a constant output current for a range of lateral offset values in accordance with certain embodiments described herein.

FIG. 17 is a plot of an example selection of coupling states and reactance states to approximate a constant output current (e.g., 13 amps) for a range of lateral offset values in accordance with certain embodiments described herein. For the lowest values of lateral offset (e.g., from 0 to about 50 mm), the controller can select the coupling state in which current from only the QD coil is used and the reactance state of the QD coil being in the "low" reactance configuration. For the next higher values of lateral offset (e.g., from about 50 mm to about 90 mm), the controller can select the coupling state in which current from only the QD coil is used and the reactance state of the QD coil being in the "high" reactance configuration. For the next higher values of lateral offset (e.g., from about 90 mm to about 150 mm), the controller can select the coupling state in which current from only the DD coils is used and the reactance state of the DD coils being in the "high" reactance configuration. For the next higher values of lateral offset (e.g., from about 150 mm to about 180 mm), the controller can select the coupling state in which current from both the QD coil and the DD coils is used and the reactance state of the QD coil being in the "low" reactance configuration and the reactance state of the DD coils being in the "low" reactance configuration. For the next higher values of lateral offset (e.g., above about 180 mm), the controller can select the coupling state in which current from only the DD coils is used and the reactance state of the DD coils being in the "high" reactance configuration.

Figure 18:
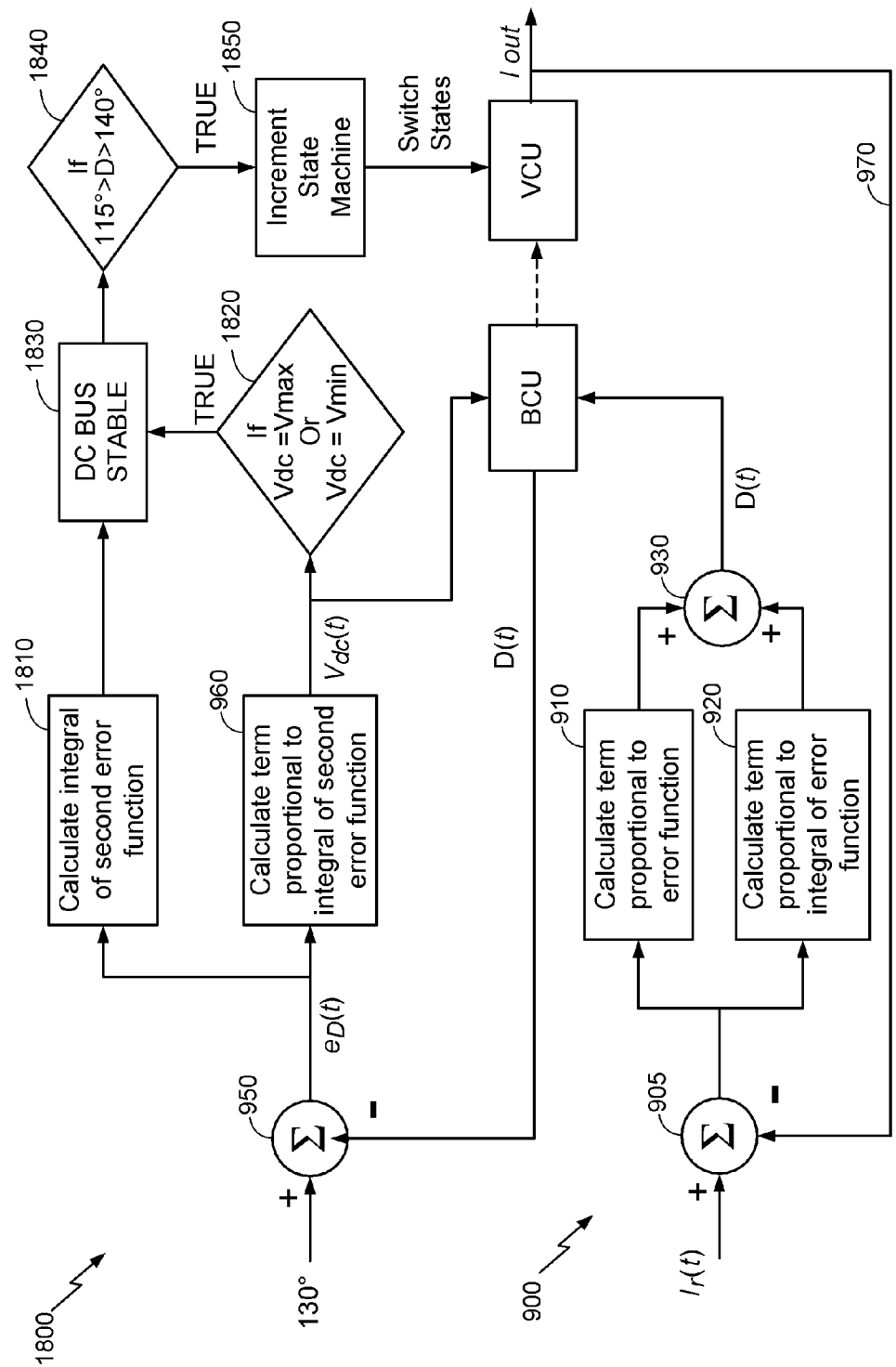
FIG. 18 schematically illustrates a controller compatible with certain embodiments described herein.

FIG. 18 schematically illustrates a controller 1800 compatible with certain embodiments described herein. The controller 1800 includes the PI controller 900 schematically illustrated in FIG. 9C, with additional functionality. To determine whether the DC bus voltage is stable, the integral of the second error function $e_D(t)$ is calculated in the module 1810 and if the integral equals zero and if $V_{dc}$ equals the maximum voltage or the minimum voltage (e.g., determined in the module 1820), then the DC bus voltage is deemed stable in the module 1830. The conduction angle (e.g., the duty cycle) is measured and determined whether it is within the desired range that corresponds to the selected operating zone (e.g., between 115° and 140°) in the module 1840. If the conduction angle is outside the desired range, the reactance states of the various inductive elements may be switched to achieve the selected operating zone. For example, the state machine can be incremented only after the normal output current control and the DC bus voltage are stable.

If the conduction angle is within the desired range, the controller 1800 increments its state machine in the module 1850 to select which coupling and reactance states to use. If the coupling circuit is not in the selected coupling and reactance states, then the controller 1800 sends appropriate control signals to the various switching elements of the coupling circuit to achieve the selected coupling and reactance states.

Figure 19:
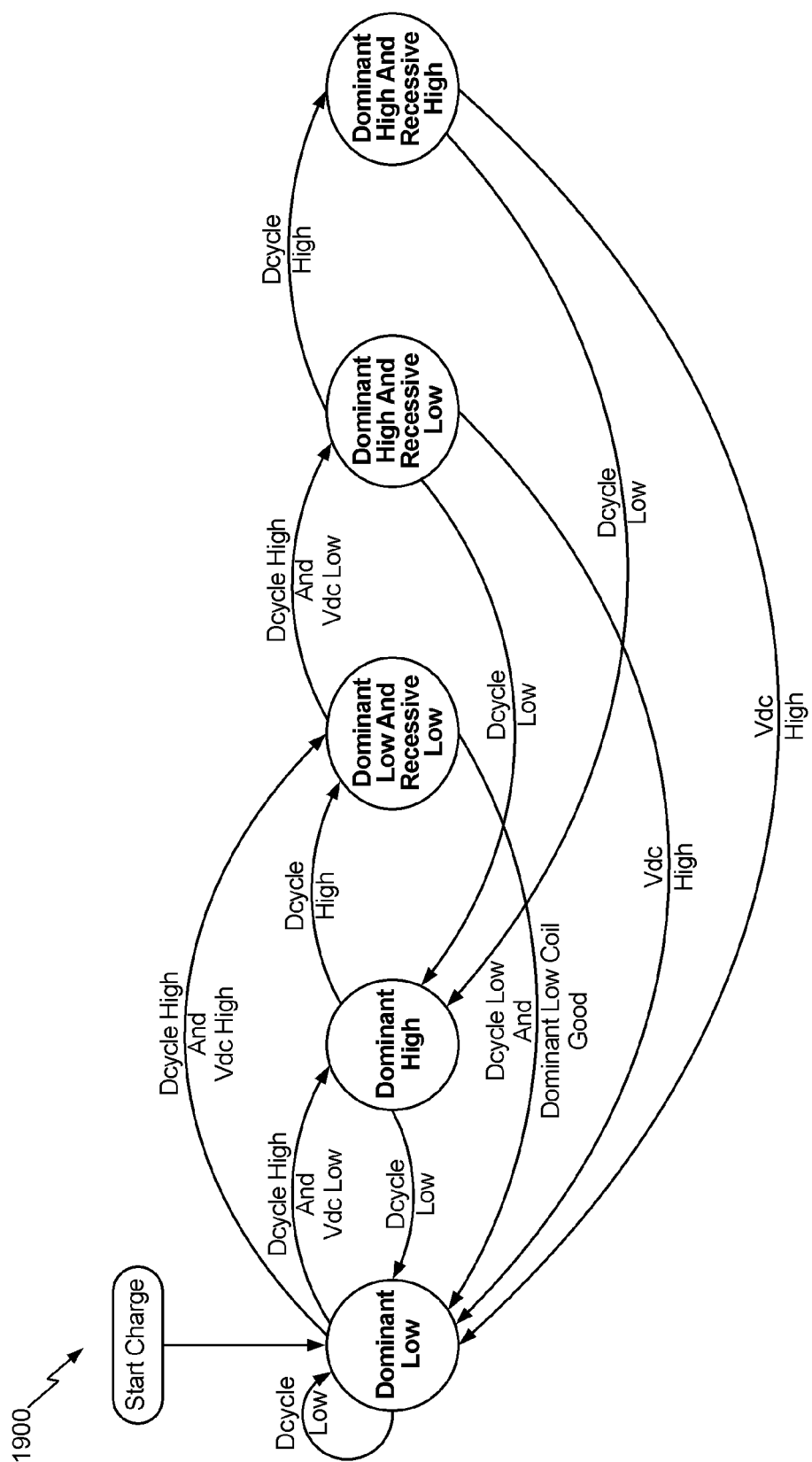
FIG. 19 schematically illustrates an example state machine of the controller compatible with certain embodiments described herein.

However, in certain embodiments, the use of all eight possible permutations may not be needed, and only some of the possible permutations may be used. Certain such embodiments can advantageously avoid excessive switching among the various coupling states and reactance states. FIG. 19 schematically illustrates an example state machine 1900 of the controller compatible with certain embodiments described herein. For example, the state machine 1900 of FIG. 19 uses only five of the eight possible permutations, which are shown in FIG. 19 are increasing in output current from left to right: (i) "dominant low": only the dominant inductive element providing current to the load while in its "low" reactance state; (ii) "dominant high": only the dominant inductive element providing current to the load while in its "high" reactance state; (iii) "dominant low and recessive low": both the dominant inductive element while in its "low" reactance state and the recessive inductive element while in its "low" reactance state providing current to the load; (iv) "dominant high and recessive low": both the dominant inductive element while in its "high" reactance state and the recessive inductive element while in its "low" reactance state providing current to the load; and (v) "dominant high and recessive high": both the dominant inductive element while in its "high" reactance state and the recessive inductive element while in its "high" reactance state providing current to the load. In certain such embodiments, the following permutations are not used: the dominant inductive element is in its "low" reactance state while the recessive inductive element is in its "high" reactance state; only the recessive inductive element is in its "low" reactance state; and only the recessive inductive element is in its "high" reactance state.

In deciding whether to switch among the coupling and reactance states, the state machine 1900 of FIG. 19 utilizes information regarding whether the duty cycle ("Dcycle") is below the desired range of values (e.g., whether the conduction angle is below 115 degrees) or whether the duty cycle is above the desired range of values (e.g., whether the conduction angle is above 140 degrees). The state machine 1900 also utilizes information regarding whether the DC bus voltage is low (e.g., less than 328 volts) or whether the DC bus voltage is high (e.g., greater than 332 volts). The state machine 1900 also utilizes information regarding whether the dominant inductive element has enough current to meet the desired output current by itself (e.g., "dominant low coil good"). Such an evaluation can be based on couplings measured during a verification of the alignment, scaled for output voltage, of the inductive elements of the power receiver with those of the power transmitter.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations. For example, a power receiver configured to supply current to a load and to be wirelessly operatively coupled to a power transmitter can comprise means for inductively generating current (e.g., a plurality of inductive elements including at least a first inductive element or a second inductive element) in response to a magnetic field generated by the power transmitter. The power receiver can further comprise first means for selectively switching among a plurality of coupling states (e.g., a first sub-circuit having switching elements configured to selectively connect the inductive elements to the load). Each coupling state of the plurality of coupling states has a corresponding portion of the means for inductively generating current configured to provide current to the load. The power receiver can further comprise second means for selectively switching the means for inductively generating current among a plurality of reactance states (e.g., a plurality of second sub-circuits each having one or more switching elements configured to change the reactance of a corresponding inductive element connected to the load and one or more capacitive elements). The power receiver can further comprises means for controlling the first means for selectively switching and for controlling the second means for selectively switching in response to one or more signals indicative of one or more operating parameters of at least one of the power receiver or the power transmitter (e.g., a processor).

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the invention.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A power receiver configured to supply current to a load and to be wirelessly operatively coupled to a power transmitter, the power receiver comprising:
    a plurality of inductive elements configured to inductively generate current in response to a magnetic field generated by the power transmitter;
    a coupling circuit operatively coupled to the plurality of inductive elements, the coupling circuit configured to be selectively switched among a plurality of coupling states, each coupling state of the plurality of coupling states having a corresponding set of inductive elements of the plurality of inductive elements configured to provide current to the load, the coupling circuit further configured to be selectively switched such that each inductive element of the set of inductive elements has a reactance state of a plurality of reactance states; and
    a controller coupled to the coupling circuit and configured to select the coupling state from the plurality of coupling states and to select the reactance state of each inductive element of the set of inductive elements from the plurality of reactance states based on one or more signals indicative of one or more operating parameters of at least one of the power receiver or the power transmitter.

2. The power receiver of claim 1, wherein the plurality of inductive elements comprises at least a first inductive element configured to inductively couple to a first portion of the magnetic field or a second inductive element configured to inductively couple to a second portion of the magnetic field.

3. The power receiver of claim 2, wherein the first inductive element comprises a first loop enclosing a first area and a second loop enclosing a second area, the first loop and the second loop substantially co-planar with one another.

4. The power receiver of claim 3, wherein the second inductive element comprises a third loop enclosing a third area, the third loop generally parallel and non-planar to the first loop and the second loop, wherein a center of the third area is positioned substantially over a point between the first loop and the second loop.

5. The power receiver of claim 2, wherein the plurality of coupling states comprises at least a first coupling state in which the set of inductive elements includes only one of the first inductive element and the second inductive element or a second coupling state in which the set of inductive elements includes both the first inductive element and the second inductive element.

6. The power receiver of claim 1, wherein the coupling circuit comprises a plurality of sub-circuits, each sub-circuit operatively coupled to a corresponding inductive element of the plurality of inductive elements, each sub-circuit comprising one or more switching elements and one or more capacitive elements, wherein the controller is configured to adjust the one or more switching elements of each sub-circuit of the plurality of sub-circuits to set the reactive state of the corresponding inductive element.

7. The power receiver of claim 6, wherein, for each reactance state of the plurality of reactance states, the corresponding inductive element has substantially the same resonant frequency.

8. The power receiver of claim 6, wherein the plurality of reactance states comprises at least a first reactance state having a first reactance or a second reactance state having a second reactance, wherein the second reactance is greater than the first reactance.

9. The power receiver of claim 1, wherein the one or more operating parameters comprise a DC bus voltage of the power transmitter and a duty cycle of the power transmitter, wherein the controller selects the coupling state of the coupling circuit and the reactance state of each inductive element of the set of inductive elements based on the DC bus voltage and the duty cycle.

10. The power receiver of claim 9, wherein the power transmitter comprises a power inverter configured to convert the DC bus voltage to an alternating current, the power inverter having a bridge phase angle that generally corresponds to the duty cycle of the power transmitter.

11. The power receiver of claim 9, wherein the plurality of inductive elements comprises at least a first inductive element or a second inductive element, wherein the one or more operating parameters further comprise a first current generated by the first inductive element and a second current generated by the second inductive element, wherein the controller is configured to denote the first inductive element as a dominant inductive element and the second inductive element as a recessive inductive element if the first current is greater than the second current, wherein the controller is further configured to denote the second inductive element as the dominant inductive element and the first inductive element as the recessive inductive element if the second current is greater than the first current.

12. The power receiver of claim 11, wherein the plurality of coupling states comprises at least a first coupling state in which the set of inductive elements includes only the dominant inductive element, or a second coupling state in which the set of inductive elements includes both the dominant inductive element and the recessive inductive element.

13. A method for controlling a current supplied to a load by a power receiver wirelessly operatively coupled to a power transmitter, the power receiver comprising a plurality of inductive elements configured to inductively generate current in response to a magnetic field generated by the power transmitter, the method comprising:
adjusting a coupling state of the power receiver based on one or more operating parameters of at least one of the power receiver or the power transmitter, the coupling state selected from a plurality of coupling states, each coupling state of the plurality of coupling states having a corresponding set of inductive elements of the plurality of inductive elements configured to provide current to the load; and
adjusting a reactance state for each inductive element of the set of inductive elements based on the one or more operating parameters of at least one of the power receiver or the power transmitter, the reactance state selected from a plurality of reactance states.

14. The method of claim 13, wherein the plurality of coupling states comprises at least a first coupling state in which the set of inductive elements includes only one of a first inductive element or a second inductive element of the plurality of inductive elements, or a second coupling state in which the set of inductive elements includes both the first inductive element and the second inductive element.

15. The method of claim 14, wherein adjusting the coupling state of the power receiver comprises placing the power receiver in either the first coupling state or the second coupling state.

16. The method of claim 14, wherein the one or more operating parameters comprise a first current generated by the first inductive element and a second current generated by the second inductive element, wherein adjusting the coupling state of the power receiver comprises denoting the first inductive element as a dominant inductive element and the second inductive element as a recessive inductive element if the first current is greater than the second current, and denoting the second inductive element as the dominant inductive element and the first inductive element as the recessive inductive element if the second current is greater than the first current.

17. The method of claim 16, wherein, in the first coupling state, the set of inductive elements includes only the dominant inductive element, and in the second coupling state, the set of inductive elements includes both the dominant inductive element and the recessive inductive element.

18. The method of claim 13, wherein adjusting the reactance state comprises keeping a resonant frequency of each inductive element of the set of inductive elements to be unchanged.

19. The method of claim 13, wherein adjusting the reactance state comprises placing each inductive element of the set of inductive elements in either a first reactance state having a first reactance or a second reactance state having a second reactance, wherein the second reactance is greater than the first reactance.

20. The method of claim 13, wherein the one or more operating parameters comprise a DC bus voltage of the power transmitter and a duty cycle of the power transmitter, and adjusting the coupling state comprises selecting the set of inductive elements based on the DC bus voltage and the duty cycle, and adjusting the reactance state comprises selecting a reactance state for each inductive element of the set of inductive elements based on the DC bus voltage and the duty cycle.

21. The method of claim 13, wherein the load comprises a battery being charged by the current supplied to the load.

22. The method of claim 21, wherein adjusting the coupling state and adjusting the reactance state comprise optimizing charging of the battery while preventing oscillations of the current supplied to the load.

23. The method of claim 21, further comprising adjusting a current of the power transmitter such that the power receiver is within a predetermined operating zone defined at least by a maximum current provided to the battery, a maximum voltage provided to the battery, or a maximum power provided to the battery.

24. A power receiver configured to supply current to a load and to be wirelessly operatively coupled to a power transmitter and, the power receiver comprising:
means for inductively generating current in response to a magnetic field generated by the power transmitter;
first means for selectively switching among a plurality of coupling states, each coupling state of the plurality of coupling states having a corresponding portion of the means for inductively generating current configured to provide current to the load;

second means for selectively switching the means for inductively generating current among a plurality of reactance states; and means for controlling the first means for selectively switching and for controlling the second means for selectively switching based on one or more signals indicative of one or more operating parameters of at least one of the power receiver or the power transmitter.

25. The power receiver of claim 24, wherein the means for inductively generating current comprises at least a first inductive element or a second inductive element.

26. The power receiver of claim 25, wherein the first inductive element is configured to inductively couple to a first portion of the magnetic field and the second inductive element is configured to inductively couple to a second portion of the magnetic field.

27. The power receiver of claim 24, wherein the first means for selectively switching comprises a first sub-circuit operatively coupled to the means for inductively generating current.

28. The power receiver of claim 24, wherein the second means for selectively switching comprises a plurality of second sub-circuits, each second sub-circuit operatively coupled to a corresponding portion of the means for inductively generating current, each second sub-circuit comprising one or more switching elements and one or more capacitive elements, wherein the one or more switching elements are configured to be adjusted to set the reactive state of the corresponding portion of the means for inductively generating current.

29. The power receiver of claim 24, wherein the means for controlling the first means for selectively switching and for controlling the second means for selectively switching comprises a processor.

* * * * *